United States Patent [19]
Goto et al.

[11] Patent Number: 5,764,914
[45] Date of Patent: Jun. 9, 1998

[54] NETWORK SYSTEM FOR CONNECTING TO A NETWORK NODE FROM TERMINAL

[75] Inventors: Hisasi Goto, Kawasaki; Noritoshi Nakao, Kobe, both of Japan

[73] Assignee: Fujitsu Limited, Kawasaki, Japan

[21] Appl. No.: 301,781

[22] Filed: Sep. 7, 1994

[30] Foreign Application Priority Data

Dec. 15, 1993 [JP] Japan .................. 5-315530

[51] Int. Cl.⁶ .................. G06F 15/16; G06F 13/14
[52] U.S. Cl. .................. 395/200.57; 395/200.8; 395/200.69
[58] Field of Search .................. 395/200.02, 200.03, 395/200.1, 200.12, 200.18, 200.2, 200.79, 200.31, 200.5, 200.57, 200.76, 200.8, 200.69; 370/228, 462

[56] References Cited

U.S. PATENT DOCUMENTS

| | | | |
|---|---|---|---|
| 4,823,122 | 4/1989 | Mann et al. | 364/156 |
| 5,043,881 | 8/1991 | Hamazaki | 395/200.57 |
| 5,289,578 | 2/1994 | Hartheimer et al. | 395/200 |
| 5,341,477 | 8/1994 | Pitkin et al. | 395/200 |
| 5,371,852 | 12/1994 | Attanasio et al. | 395/200 |
| 5,448,723 | 9/1995 | Rowett | 395/200.02 |
| 5,465,330 | 11/1995 | Komatsu et al. | 395/824 |
| 5,475,819 | 12/1995 | Miller et al. | 395/200.03 |
| 5,539,884 | 7/1996 | Robrock, II . | |

FOREIGN PATENT DOCUMENTS

| | | |
|---|---|---|
| 330 835 | 9/1989 | European Pat. Off. . |
| 475 277 | 3/1992 | European Pat. Off. . |
| 511 142 | 10/1992 | European Pat. Off. . |
| 1-276952 | 11/1989 | Japan . |
| 2-28866 | 1/1990 | Japan . |
| 3-254540 | 11/1991 | Japan . |
| 3-266156 | 11/1991 | Japan . |
| 5-53946 | 3/1993 | Japan . |
| 2 251 358 | 7/1992 | United Kingdom . |

*Primary Examiner*—Mark H. Rinehart
*Attorney, Agent, or Firm*—Staas & Halsey

[57] ABSTRACT

In a computer network, a front end processor (FEP) is connected to at least one processor via a network node and connected to a plurality of terminals via a switched network. The FEP has means for executing a communications processing application, a means for creating and managing connections between the front end processor and the network nodes upon request from a terminal, a means for referring to the network nodes to be used by the particular terminal by a logic name, rather than its physical address, when communicating, and a means for changing and/or updating the logical name to be used by the terminal when addressing the network node. The FEP has an internal connection means holding a node management table indicating connection relationships between the terminals and network nodes so that no access to a name server is required. This reduces network traffic and facilitates flexibility in setting connections.

7 Claims, 21 Drawing Sheets

5,764,914

NETWORK SYSTEM FOR CONNECTING TO A NETWORK NODE FROM TERMINAL

BACKGROUND OF THE INVENTION

1. Field of the Invention

The present invention relates to a network system selectively connected a node of a network to terminals by dialing from a terminal connected to a switched network and, more particularly, to a loosely-coupled multiprocessor system suitable for the network system, for providing an adequate data transmission/reception function between each application process in a plurality of processors and each terminal.

2. Description of the Related Art

In the conventional network system, a terminal connected to a node via a switched network is connected to a node inside the network by dialing from the terminal to a previously defined destination. Alternatively, a connecting destination of the terminal is randomly changed when necessary and the terminal is connected to a selected destination. In order to change the connecting destinations of the terminal, one of the following methods is used.

(a) The operator of the terminal dials to a preset connection node in the network while taking the operation schedule into account.

(b) The destination is dynamically changed by incorporating a program for changing a connecting destination based on the preset operation schedule and dialing to the destination from the terminal.

As described above, when a connection node is changed by dialing from the terminal connected via the switched network, the operator of the terminal is required to dial while taking the operation schedule into account in the method (a). In this method, when the operation schedule becomes complicated, the load on the operator of the terminal becomes heavier.

Further, in the method (b), it is necessary to incorporate a destination changing program into the terminal. In this case, the destination changing program must be incorporated into all of the terminals used for effecting the operation via the switched network. For this reason, in order to adequately cope with the change or variation of the operation schedule, the cost is raised.

SUMMARY OF THE INVENTION

An object of the present invention is to provide a network system capable of flexible and adequate destination management, taking countermeasure against defects, and altering the operation process according to the operating condition of the system between a switched network to which a terminal is connected and a network to which a host processor is connected when dialing is made from the terminal.

Another object of the present invention is to provide a multiprocessor system which controls the data transmission/reception process by use of an application process in each processor, and permits a processor for connecting the terminal to be dynamically changed so as to make it possible to commonly use the terminal by the application process in each processor. This system controls destination management, provides countermeasure against defects, and provides operation processes in the network system.

A network system according to a first aspect of the present invention includes at least one front end processor system (which is hereinafter referred to as an FEP system) which is connected to at least one host processor (which is hereinafter referred to as a host) via a network node and is connected to a plurality of terminals via a switched network. This system makes it possible to flexibly and adequately control destination management, take countermeasure against defects, and control the operation process according to the operating condition of the system between a switched network to which a terminal is connected and a network to which the host is connected when dialing from the terminal. This is accomplished by controlling the management and connection of the network node and processor for connecting the terminal in response to the dialing from the terminal, referring to the network node registered as a name of a connecting destination for a terminal specified by the communication processing application, and changing/updating the name of the connecting destination of the specified terminal by the communication processing application by use of the FEP system. Thus the processes of the communication processing application and the communication access method are controlled.

The network system includes a terminal, switched network, FEP system, circuit/network, and host.

A plurality of terminals are connected to the switched network and the terminals are operated by users or operators. The switched network connects the terminal to the FEP system.

The FEP system is connected to the host via the circuit/network. That is, a plurality of nodes of the circuit/network are connected to at least one FEP system and at least one host.

The host includes a communication processing application executing section for executing the communication processing application, a communication processing server section for executing the communication processing server process and a communication access method processing section for processing the communication access method.

Also, the FEP system includes a communication processing application executing section for executing the communication processing application, a communication processing server section for executing the communication processing server process and a communication access method processing section for effecting the process of the communication access method. In general, the communication processing application executing section of the FEP system may be of smaller scale in performance than the communication processing application executing section of the host.

The FEP system can control the management and connection of the network node and processor for connecting the terminal in response to the dialing from the terminal. In addition, the FEP system can refer to the network node registered as a name of a connecting destination for a terminal specified by the communication processing application executed by the communication processing application executing section, and change/update the name of the connecting destination of the specified terminal by the communication processing application.

The FEP system further includes a connection node management section, destination name reference section, destination name changing section, connecting process section and operation information fetching section. In this case, typically, the destination name reference section, destination name changing section and operation information fetching section are provided in the communication processing application executing section, and the connection node management section and connecting process effecting section are provided in the communication access method processing section. The communication processing application executing section and the communication access method processing section are connected to each other via the communication processing server section.

The connection node management section holds a node management table indicating the connecting relation between the terminals and the network nodes of the processors to be connected to the terminals for each terminal unit. This section also manages the connection of one of the network nodes of one of the processors to which the terminal is connected when dialing is made from the terminal to the FEP system.

The destination name reference section informs a network node name registered as the connecting destination name of the specified terminal in the node management table to the communication processing application when the communication processing application operated in the FEP system specifies the terminal name and issues a system call of destination name reference.

The destination name changing section updates the connecting destination name of the specified terminal in the node management table into a specified network node name when the communication processing application specifies the terminal name and network node name and issues a system call of destination name change.

The connecting process effecting section refers to the connection node management table to determine a connection network node and transmit a connection request to the node when dialing is made from the terminal to the FEP system.

The operation information fetching section fetches operation information used by the communication processing application for changing the connecting destination name of the terminal.

Further, the operation information fetching section refers to the operation schedule of the host, and the connection node management section deals with the connection node of the terminal as the network node in the host at the time of operation of the host based on the operation schedule of the host and changes the destination as the network node in another host which is used instead of the former host at the time of interruption of the former host.

Further, the operation information fetching section refers to the operation schedule of the host, and the connection node management section deals with the connection node of the terminal as the network node in the host at the time of operation of the host based on the operation schedule of the host and deals with the communication processing application executed in the FEP system as the network node to be connected to the terminal and changes the destination at the time of interruption of the host.

The operation information fetching section determines the operation schedule by permitting the communication processing application operated in the FEP system to communicate with the communication processing application operated in the host.

In the network system, at least one FEP system having the communication processing application incorporated therein is connected to the host, and in a case where the terminal is connected to a node in the network when the operation is affected, a connection request can be always distributed from the FEP system to network nodes which are affected at this time simply by dialing to the FEP system and the terminal can be connected to an effective node.

A multiprocessor system according to a second aspect of the present invention includes a loose-coupling multiprocessor system which has a plurality of multiprocessors connected in parallel arrangement to an input/output bus. Each processor includes an application process section, communication processing server process section and communication access method process section. The communication processing server process section can derive a processor identifying number from a communication identifier specified according to the terminal of transmitting destination. This number is set with its inherent meaning in the multiprocessor system including processor identifying numbers and array numbers in the terminal management table stored in the processor at the time of execution of a system call of data transmission by the application process. This permits the data transmission/reception process to be effected by use of the application process in each processor by sending transmission data to a processor determined by the processor identifying number so as to effect the transmission process to the terminal by the communication processing server process of the processor. This permits a processor to which the terminal is connected to be dynamically changed, and permits the terminal to be commonly used by the application processes of the respective processors, thus making it possible to always effect the operations.

The multiprocessor system includes a plurality of terminals and a loose-coupling multiprocessor system. The loose-coupling multiprocessor system has a plurality of processors each of which includes an application process execution section, communication processing server process execution section and communication access method process execution section. The terminals are connected to a plurality of processors via a switched network.

The communication processing server process execution section derives a processor identifying number from a communication identifier specified for the terminal of transmitting destination and sends transmission data to a processor determined by the processor identifying number to effect the transmission process to the terminal by the communication processing server process in the processor at the time of execution of a system call of data transmission by the application process. The communication identifier is defined with its inherent meaning in the multiprocessor system so as to include a processor identifying number and an array number in the terminal management table stored in the processor.

The communication processing server process execution section may include a communication identifier deriving section, communication identifier informing section and processor identifying number deriving section. The communication identifier deriving section derives an inherent number in the multiprocessor system obtained by a combination of the processor identifying number and the array number in the terminal management table in the processor as the communication identifier at the time of connection of the terminal to the processor. The communication identifier informing section informs the communication identifier to the application process at the time of informing of the processing result of the terminal connection. The processor identifying number deriving section derives a processor identifying number from the communication identifier specified for the terminal of transmitting destination at the time of execution of the system call of data transmission by the application process.

Further, it is possible that the loose-coupling multiprocessor system gives a standby attribute to one processor and gives an available attribute to the remaining processor or processors. The standby processor operates as a back-up processor when the available processor is damaged. Each processor is given a preset logical processor name, the standby processor takes over the logical processor name of the available processor. The array number of the logical processor name list is allotted as the processor identifying number when the standby processor backs up the available processor which becomes defective. In this case, even after the standby processor takes over the terminal which has been connected to the available processor, the relation between the terminal and the communication identifier can be kept unchanged.

Further, the multiprocessor system can be used as the FEP system in the network system.

In the multiprocessor system, a communication identifier structured as a combination of the processor identifying number and the array number in the terminal management table is dynamically allotted by the communication processing server process at the time of connection of the terminal. The communication identifier which is defined with its inherent meaning in the multiprocessor system is informed to the application process. Processors are determined based on the communication identifiers specified for the respective connection terminals at the time of transmission system call for the connected terminal by the application process. The transmission process is effected by sending transmission data to the processors. Therefore, even when the processor becomes abnormal and the back-up processor takes over the corresponding terminal, the universality of the interface of transmission system call can be kept.

Further, the multiprocessor system is suitable for effecting the destination management, taking the countermeasure against defects, and effecting the operation process.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

There will now be described embodiments of the present invention with reference to the accompanying drawings.

First Embodiment

Figure 1:
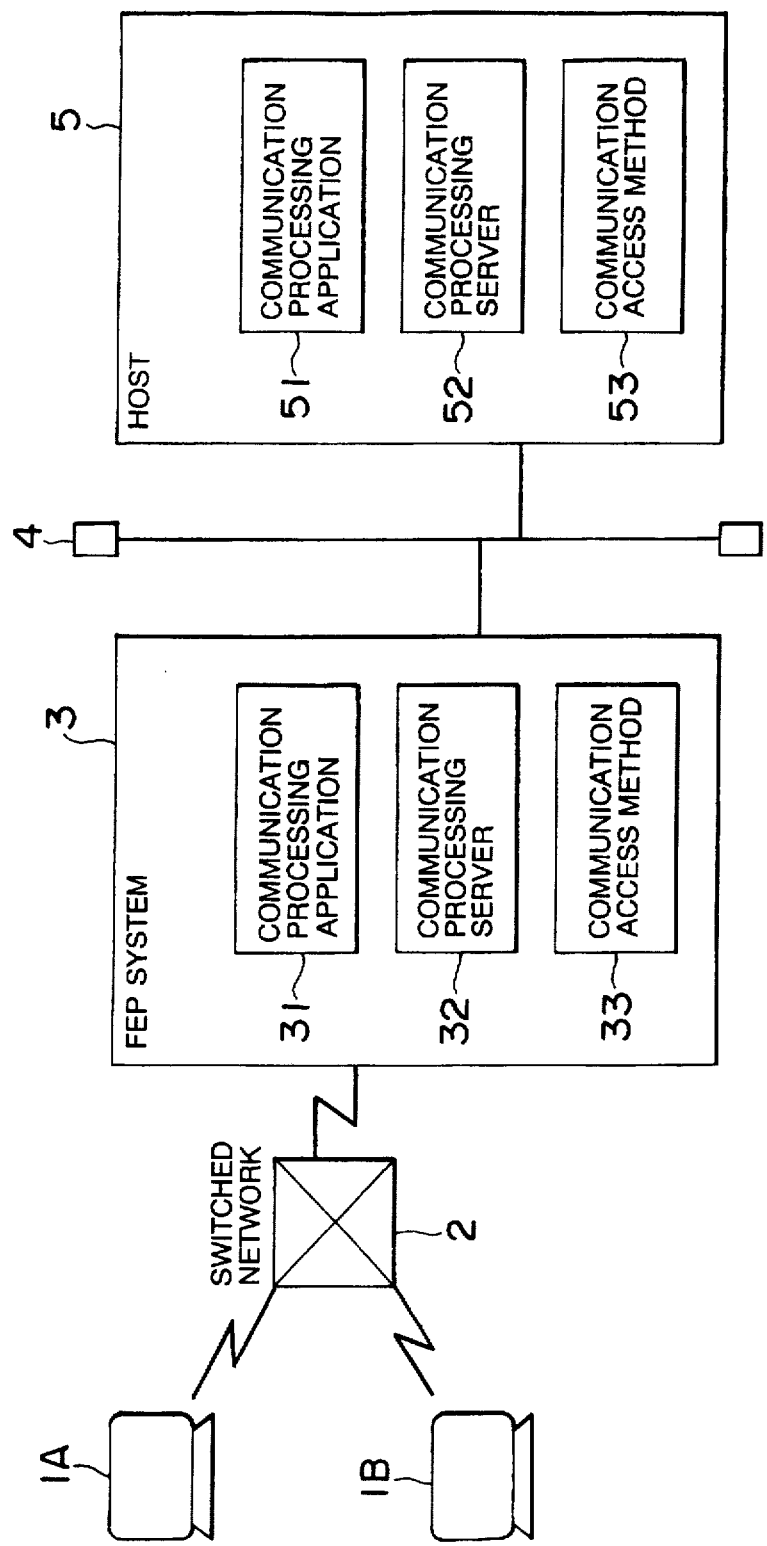
FIG. 1 is a block diagram showing the principle construction of a network system according to a first embodiment of the present invention.

The principle construction of a network system according to a first embodiment of the present invention is shown in FIG. 1.

The network system according to the first embodiment of the present invention is designed as a network system which includes an FEP system connected to at least one host via a network node and connected to a plurality of terminals via a switched network, and which makes it possible to flexibly and adequately effect the destination management, take the countermeasure against defects, and effect the operation process according to the operating condition of the system between a switched network to which a terminal is connected and a network to which the host is connected when dialing is made from the terminal by effecting the management and connection of the network node and processor for connecting the terminal in response to the dialing from the terminal, referring to the network node registered as a name of a connecting destination for a terminal specified by the communication processing application executed by the communication processing application executing means, and the changing/updating the name of the connecting destination of the specified terminal by the communication processing application by use of the FEP system and thus effecting the processes of the communication processing application and the communication access method.

The network system shown in FIG. 1 includes terminals 1A, 1B, switched network 2, FEP system 3, circuit/network 4 and host 5.

The terminals 1A and 1B are operated by the users, that is, operators. In FIG. 1, two terminals 1A and 1B are shown, but three or more terminals may be connected to the switched network 2.

The switched network 2 connects the terminals 1A and 1B to the FEP system 3.

The FEP system 3 is connected to the host 5 via the circuit/network 4. In FIG. 1, only one host 5 is shown, but a plurality of hosts may be connected to the circuit/network 4 via network nodes. Likewise, in FIG. 1, only one FEP system 3 is shown, but a plurality of FEP systems may be connected to the circuit/network 4 via network nodes. Also, in this case, each FEP system is connected to a plurality of terminals via a switched network.

The host 5 includes a communication processing application executing section 51 for executing the communication processing application, a communication processing server section 52 for executing the communication processing server and a communication access method processing section 53 for processing the communication access method.

Also, the FEP system includes a communication processing application executing section 31 for executing the communication processing application, a communication processing server section 32 for executing the communication processing server and a communication access method processing section 33 for processing the communication access method. In general, the performance of the communication processing application executing section 31 of the FEP system 3 may be lower than the performance of the communication processing application executing section 51 of the host 5.

The FEP system 3 performs the management and connection of the network node and processor for connecting the terminal in response to the dialing from the terminal 1A, 1B. The FEP system refers to the network node registered as a name of a connecting destination for a terminal specified by the communication processing application executed by the communication processing application executing section 31. The FEP system updates the name of the connecting destination of the specified terminal by the communication processing application.

The communication processing application executing section 31 and the communication access method processing section 33 are connected to each other via the communication processing server section 32.

The communication processing application executing section 31 has a function of informing a network node name registered as a connecting destination name of the specified terminal in the node management table to the communication processing application when the communication processing application operated in the FEP system specifies a terminal name and issues a system call of reference to the destination name. Section 31 also has a function of updating the connecting destination name of the specified terminal in the node management table to a specified network node name when the communication processing application specifies the terminal name and network node name and issues a system call of updating of the destination name. Section 31 also has a function of deriving operation information which the communication processing application utilizes to change the connecting destination name of the terminal.

The communication access method processing section 33 holds a node management table indicating the connecting relation between the terminals and the network nodes of the processors to be connected to the terminals for each terminal unit. Section 33 also has a function of managing the connection of one of the network nodes of one of the processors to which the terminal is connected when dialing is made from the terminal to the FEP system. Section 33 also has a function of referring to the connection node management table to determine a connection network node and transmit a connection request to the node when dialing is made from the terminal to the FEP system.

The communication processing application executing section 31 refers to the operation schedule of the host and the communication access method processing section 33 may deal with the connection node of the terminal as a network node in the host at the time of operation of the host based on the operation schedule of the host and may change the destination as the network node in another host which can be used instead of the former host at the time of interruption of the former host.

Further, the communication processing application executing section 31 refers to the operation schedule of the host. The communication access method processing section 33 deals with the connection node of the terminal as a network node in the host at the time of operation of the host based on the operation schedule of the host. Section 33 also deals with the communication processing application executed in the FEP system as the network node to be connected to the terminal and change the destination at the time of interruption of the host.

The communication processing application executing section 31 may determine the operation schedule by permitting the communication processing application operated in the FEP system and the communication processing application operated in the host to be communicated to each other.

Thus, in the network system of FIG. 1, in a case where the FEP system 3 having the communication processing application incorporated therein is connected to at least one host 5 and the terminal 1A, 1B is connected to a node in the network at the time of execution of the operation, a connection request can be distributed from the FEP system 3 to network nodes which are effective at this time simply by dialing to the FEP system 3 and the terminal 1A, 1B can be connected to the effective node. Therefore, in the network system of FIG. 1, it is possible to flexibly and adequately control the destination management, take the countermeasure against defects, and effect the operation process according to the operating condition of the system between a switched network to which the terminal is connected and a network to which the host processor is connected when dialing is made from the terminal.

Second Embodiment

Figure 2:
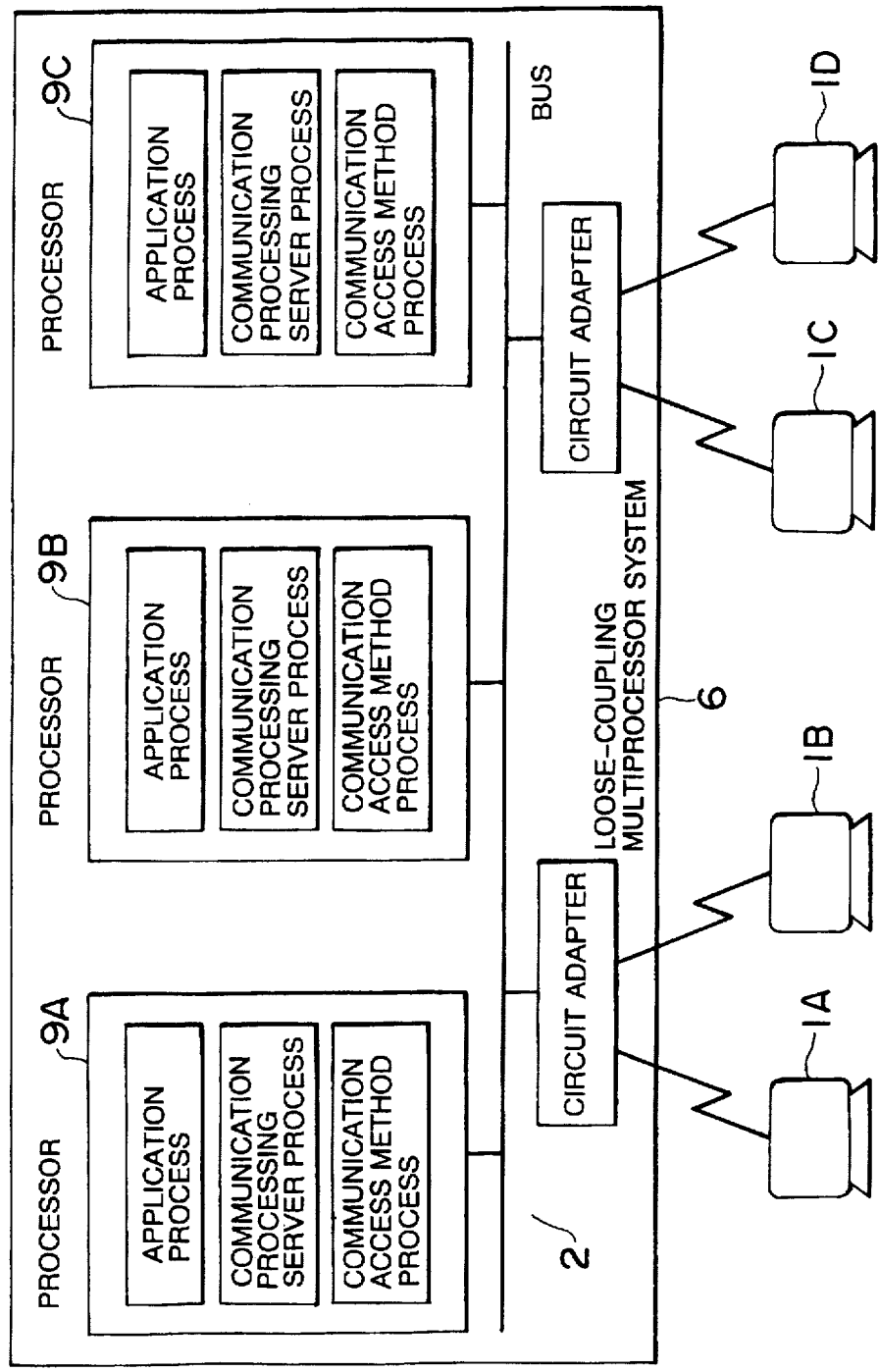
FIG. 2 is a block diagram showing the principle construction of a network system according to a second embodiment of the present invention.

The principle construction of a multiprocessor system according to a second embodiment of the present invention is shown in FIG. 2.

The multiprocessor system shown in FIG. 2 includes a loose-coupling multiprocessor system which has a plurality of multiprocessors connected in parallel arrangement to an input/output bus. Each processor includes an application process section, communication processing server process section and communication access method process section. The communication processing server process section derives a processor identifying number from a communication identifier, which is set with its inherent meaning in the multiprocessor system and includes a processor identifying number specified according to the terminal of transmitting destination and an array number in the terminal management table stored in the processor at the time of execution of a system call of data transmission by the application process. This permits the data transmission/reception process to be effected by use of the application process in each processor by sending transmission data to a processor determined by the processor identifying number so as to effect the transmission process to the terminal by the communication processing server process of the processor. This permits a processor to which the terminal is connected to be dynamically changed. This permits the terminal to be commonly used by the application processes of the respective processors, thus making it possible to always effect the operations.

The multiprocessor system includes terminals 1A, 1B, 1C and 1D and a loose-coupling multiprocessor system 6.

The loose-coupling multiprocessor system 6 has processors 9A, 9D and 9B and each of the processors 9A, 9B and 9C includes an application process execution section, communication processing server process execution section and communication access method process execution section. The terminals 1A, 1B, 1C and 1D are connected to the processors 9A, 9B and 9C via a switched network 2.

The communication processing server process execution section derives a processor identifying number from a communication identifier specified for the terminal of transmitting destination and sends transmission data to a processor determined by the processor identifying number to effect the transmission process to the terminal by the communication processing server process in the processor at the time of execution of a system call of data transmission by the application process. The communication identifier is defined with its inherent meaning in the multiprocessor system so as to include a processor identifying number and an array number in the terminal management table stored in the processor.

The communication processing server process execution section derives an inherent number in the multiprocessor system obtained by a combination of the processor identifying number and the array number in the terminal management table in the processor as the communication identifier at the time of connection of the terminal to the processor, and informs the communication identifier to the application process at the time of informing of the processing result of the terminal connection and derives a processor identifying number from the communication identifier specified for the terminal of transmitting destination at the time of execution of the system call of data transmission by the application process.

It is possible that the loose-coupling multiprocessor system 6 gives a standby attribute to one processor and gives an available attribute to the remaining processor or processors. The standby processor is used to be operated as a back-up processor when the available processor is damaged. Each processor is given a preset logical processor name. The standby processor takes over the logical processor name of the available processor and the array number of the logical processor name list is allotted as the processor identifying number when the standby processor backs up the available processor which becomes defective. In this case, even after the standby processor takes over the terminal which has been connected to the available processor. The relation between the terminal and the communication identifier can be kept unchanged.

Further, the multiprocessor system can be used as the FEP system in the network system.

In the multiprocessor system 6 of FIG. 2, a communication identifier structured as a combination of two information items, that is, the processor identifying number and the array number in the terminal management table is dynamically allotted by the communication processing server process at the time of connection of the terminal, the communication identifier which is defined with its inherent meaning in the multiprocessor system is informed to the application process, processors are determined based on the communication identifiers specified for the respective connection terminals at the time of transmission system call for the connected terminal by the application process, and the transmission process is influenced by sending transmission data to the processors.

Therefore, even when the processor becomes abnormal and the back-up processor takes over the corresponding terminal, the universality of the interface of transmission system call can be kept. That is, the multiprocessor system 6 of FIG. 2 can effect the data transmission/reception process by use of the application process in each of the processors and permit a processor for connecting the terminal to be dynamically changed so as to make it possible to commonly use the terminal by the application process in each processor, thus making it possible to always effect the operation and adequately use the multiprocessor system for the destination management, countermeasure against defects, and operation process in the network system.

Third Embodiment

Figure 3:
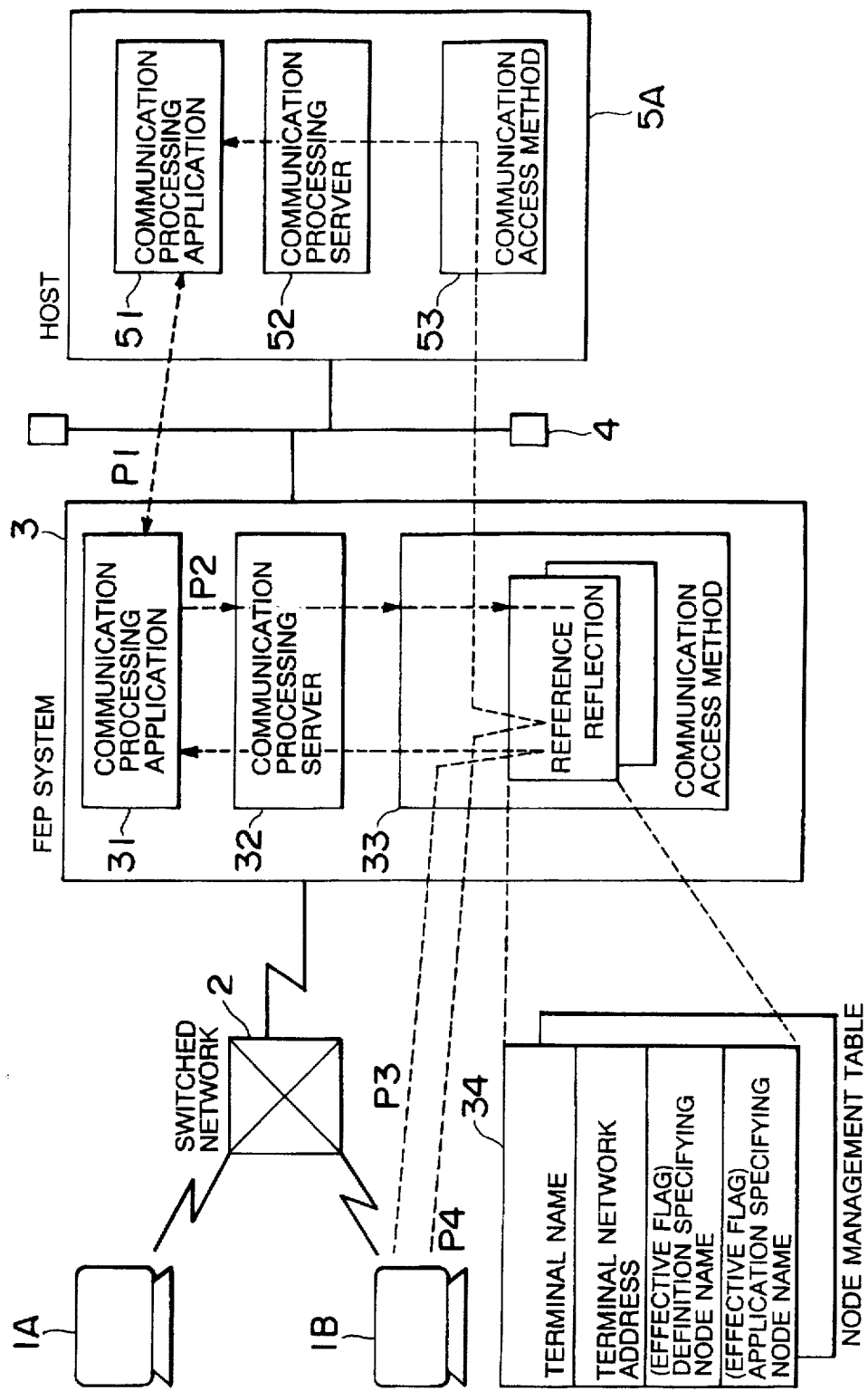
FIG. 3 is a block diagram showing the construction of a network system according to a third embodiment of the present invention.

The construction of a network system according to a third embodiment of the present invention is shown in FIG. 3. In FIG. 3, portions which are substantially the same as those of FIG. 1 are denoted by the same reference numerals.

The network system of FIG. 3 includes terminals 1A, 1B ..., switched network 2, FEP system 3, circuit/network 4, and hosts 5A ....

The terminals 1A, 1B ... are connected to the FEP system 3 via the switched network 2.

The FEP system 3 is connected to at least one host 5A ... via the circuit/network 4 constructed by a high-speed LAN (Local Area Network) circuit or network circuit.

The hosts 5A ... each include a communication processing application execution section 51 for executing the communication processing application, a communication processing server section 52 for effecting the communication processing server process, and a communication access method process section 53 for effecting the process of the communication access method.

Also, the FEP system 3 includes a communication processing application execution section 31 for executing the communication processing application, a communication processing server section 32 for effecting the communication processing server process, and a communication access method process section 33 for effecting the process of the communication access method. In general, the communication processing application executing section 31 of the FEP system 3 may be of smaller scale in performance than the communication processing application executing section 51 of the host 5.

The communication access method processing section 33 holds a node management table 34. In the node management table 34, a terminal name, terminal network address, definition specifying node name (including the effective flag thereof), and application specifying node name (including the effective flag thereof) are registered for each terminal.

The FEP system 3 controls the management and connection of the network node and processor for connecting the terminal in response to the dialing from the terminal 1A, 1B . . . The FEP system also refers to the network node registered as a name of a connecting destination for a terminal specified by the communication processing application executed by the communication processing application executing section 31, and changes the name of the connecting destination of the specified terminal by the communication processing application.

Figure 4:
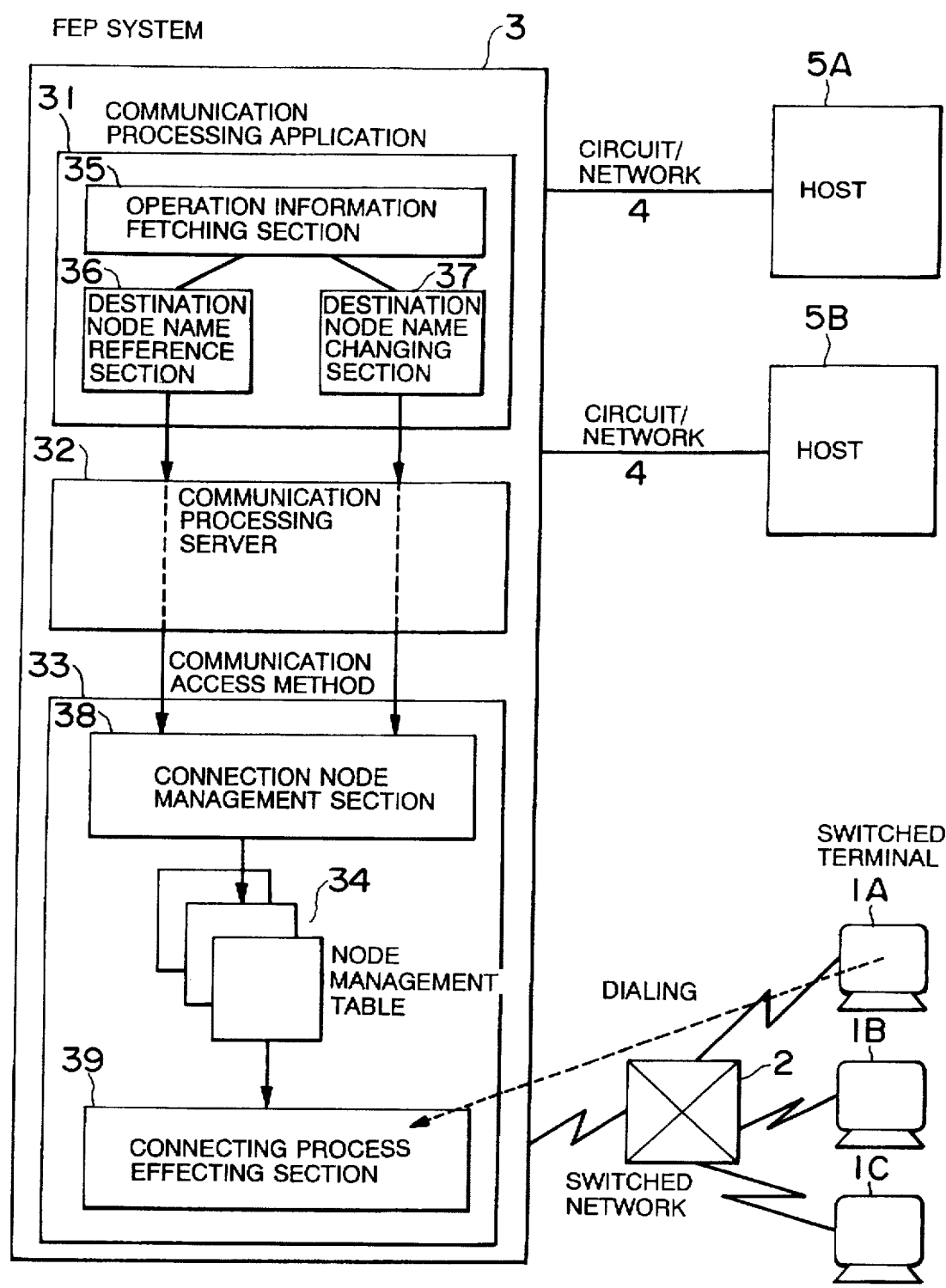
FIG. 4 is a block diagram showing the construction of the main portion of the network system of FIG. 3 in detail.

A portion in the network system of FIG. 3, mainly a portion of the FEP system 3 is shown in FIG. 4 in detail. In FIG. 4, hosts 5A, 5B and terminals 1A, 1B, 1C are shown.

As shown in FIG. 4, the communication processing application execution section 31 of the FEP system 3 includes an operation information fetching section 35, destination node name reference section 36 and destination node name changing section 37, and the communication access method processing section 33 of the FEP system 3 holds a node management table 34 and includes a connection node management section 38 and connecting process effecting section 39.

The operation information fetching section 35 fetches operation information which the communication processing application utilizes to change the connecting destination name of the terminal 1A . . . .

The destination node name reference section 36 informs a network node name registered as a connecting destination name of the specified terminal in the node management table 34 to the communication processing application when the communication processing application operated in the FEP system 3 specifies a terminal name and issues a system call of reference to the destination name.

The destination node name changing section 37 updates the connecting destination name of the specified terminal in the node management table 34 to a specified network node name when the communication processing application specifies the terminal name and network node name and issues a system call of updating of the destination name.

The connection node management section 38 uses the node management table 34, indicating the connecting relation between the terminals and the network nodes of the processors to be connected to the terminals for each terminal unit, to manage the connection of one of the network nodes of one of the processors to which the terminal is connected when dialing is made from the terminal 1A . . . to the FEP system 3.

The connecting process effecting section 39 refers to the connection node management table 34 to determine a connection network node and transmit a connection request to the node when dialing is made from the terminal 1A . . . to the FEP system 3.

Further, the operation information fetching section 35 refers to the operation schedule of the host 5A . . . , and the connection node management section 38 deals with the connection node of the terminal as the network node in the host 5A . . . at the time of operation of the host based on the operation schedule of the host 5A . . . and changes the destination to the network node in another host which can be used instead of the host 5A . . . at the time of interruption of the host.

Further, the operation information fetching section 35 refers to the operation schedule of the host 5A . . . , and the connection node management section 38 may deal with the connection node of the terminal as the network node in the host 5A . . . at the time of operation of the host based on the operation schedule of the host and may deal with the communication processing application executed in the FEP system 3 as the network node to be connected to the terminal and change the destination at the time of interruption of the host.

The operation information fetching section 35 may determine the operation schedule by permitting the communication processing application operated in the FEP system to communicate with the communication processing application operated in the host.

In FIGS. 3 and 4, as described before, the host 5A . . . and the FEP system 3 are connected to each other via a circuit/network 4 constructed by a high-speed LAN circuit, for example. The terminal 1A . . . is connected to the FEP system 3 via the switched network 2 to effect the file transfer to the host 5A . . . , for example.

Further, the communication processing application executed in the communication processing application execution section 31 of the FEP system 3 communicates with the communication processing application executed in the host 5A . . . so as to fetch the operating condition of the host machine.

The communication access method processing section 33 operated in the FEP system 3 develops the network definition having connection node names described therein for each terminal and holds the same as the node management table 34 in the main memory area of the FEP system 3. The node management table 34 is used to manage two destinations including a node name specified by the network definition and a node name specified by the communication processing application. In a case where a node name change request is not issued from the communication processing application, the destination node is distributed to a node specified by the network definition stored in the node management table 34 at the time of dialing from the terminal 1A . . . .

On the other hand, when a node name change request is issued from the communication processing application, the name is reflected on the communication processing application specifying column in the node management table 34. Then, at the time of dialing from the terminal 1A . . . , the name specified by the communication processing application is stored in the node management table 34 and the name is preferentially used and the node corresponding to the name is distributed to the node as the destination node.

The communication processing application in the FEP system 3 changes the destination node name to the FEP system 3 itself before the host 5A . . . is interrupted. Then, when the host 5A . . . is set into the operative state, the destination node name is changed to a node in the host 5A . . . .

The communication processing application in the FEP system 3 temporarily stores a file transferred from the terminal 1A . . . when the destination node is set to the FEP system 3 itself. Then, when the host machine is set into the operative state and a transfer instruction is received, it simultaneously transfers them to the host 5A . . . .

If the communication processing application in the FEP 3 can process data transferred from the terminal 1A . . . instead of the host when the destination node is set to the FEP system 3 itself, it is possible to process the file transferred from the terminal 1A instead of the host machine.

A path P1 shown in FIG. 3 indicates the mutual communication for determining the operating condition, a path P2 indicates the state in which a destination changing instruction issued according to a variation in the operating condition is reflected on the terminal management table, and paths P3 and P4 indicate states in which reference to the terminal management table is made at the time of connection and an actually effective destination is connected.

FIGS. 5, 6, 7, 8 and 9 are flowcharts respectively illustrating the operations of the connection node management section 38, destination node name reference section 36, destination node name changing section 37, connecting process effecting section 39 and operation information fetching section 35 in detail.

Figure 5:
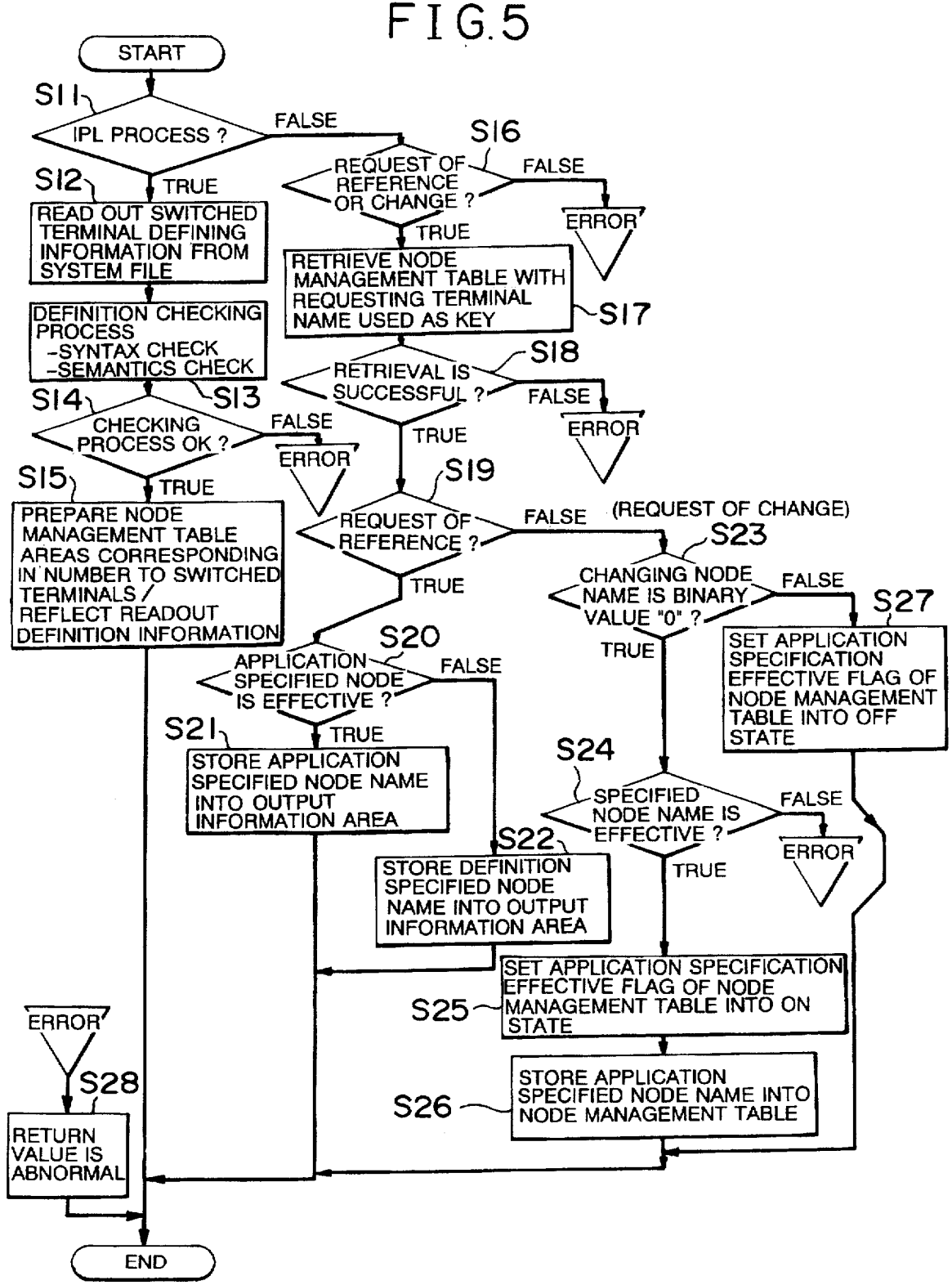
FIG. 5 is a flowchart for illustrating the operation of a connection node management section of the network system of FIG. 4.

The process of the connection node management section 38 shown in FIG. 5 is effected as follows.

When the process is started, whether an IPL (Initial Program Loader) process is executed or not is determined (step S11), and if it is "true", switched terminal definition information is read out from the system file (step S12). Next, the definition check process such as the syntax check of switched terminal definition information and the semantics check thereof is effected (step S13), and the result of the checking process is determined (step S14), and if it is "true", node management table areas corresponding in number to the switched terminals are prepared in the main memory area of the FEP system 3, the previously readout definition information is reflected (step S15) and the process is terminated.

If it is "false" in the step S11, whether or not it is the request of reference or change of destination node name is determined (step S16), and if it is determined to be "true", the node management table 34 is retrieved with the requesting terminal name used as a key (step S17). Next, whether the retrieval is successful or not is determined (step S18), and if it is "true", whether it is the request of reference or not is determined (step S19). If it is determined to be "true" in the step S19, whether the application specified node is effective or not is determined (step S20), and if it is determined to be "true", the application specified node is stored into an output information area (step S21) and the process is terminated.

If it is determined to be "false" in the step S20, the definition specified node name is stored in the output information area (step S22) and the process is terminated.

If it is determined to be "false" in the step S19, that is, if it is determined to be the request of change, whether the changing node name is a binary value "0" or not is determined (step S23), and if it is "true", whether the specified node name is effective or not is determined (step S24). If it is determined to be "true" in the step S24, the application specification effective flag of the node management table is set in the ON state (step S25), the application specified node name is stored in the node management table 34 (step S26) and the process is terminated.

When it is determined to be "false" in the step S23, the application specification effective flag of the node management table is set in the OFF state (step S27) and the process is terminated.

When it is determined to be "false" in the steps S14, S16, S18 and S24, it is determined that an error occurs and the return value is treated as an abnormal value (step S28), and the process is terminated.

Figure 6:
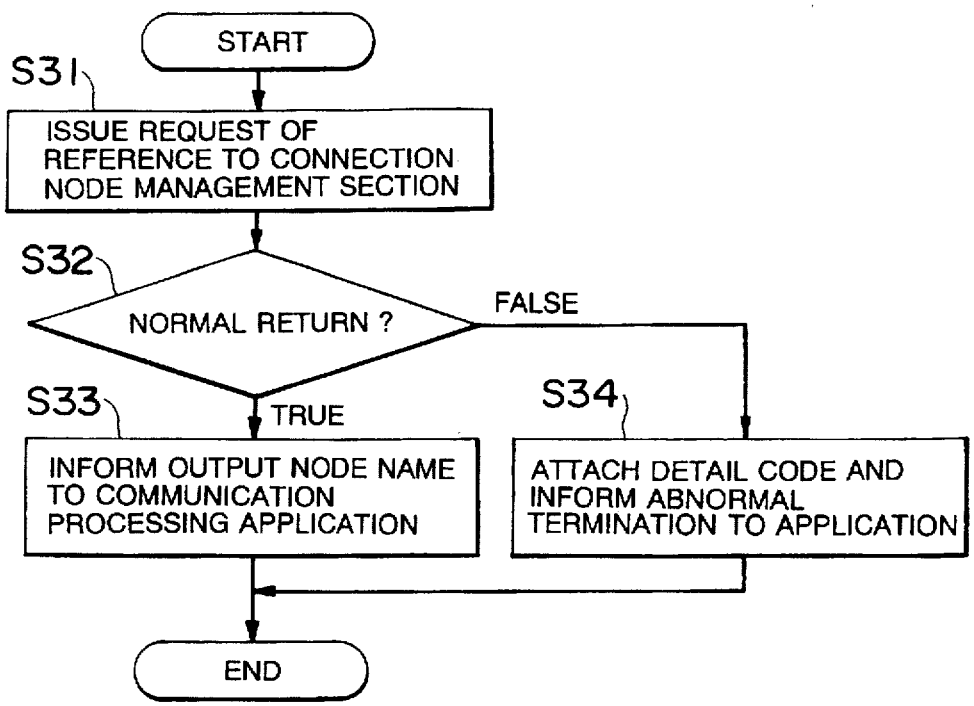
FIG. 6 is a flowchart for illustrating the operation of a destination node name reference section of the network system of FIG. 4.

The process of the destination node name reference section 36 shown in FIG. 6 is effected as follows.

When the process is started, a request of reference of the destination node name is made to the connection node management section 38 (step S31), whether it is normal return or not is determined (step S32), and it is "true", an output node name is informed to the communication processing application (step S33) and the process is terminated. If it is determined to be "false" in the step S32, a detail code of abnormal return is attached thereto, abnormal termination is informed to the application (step S34) and the process is terminated.

Figure 7:
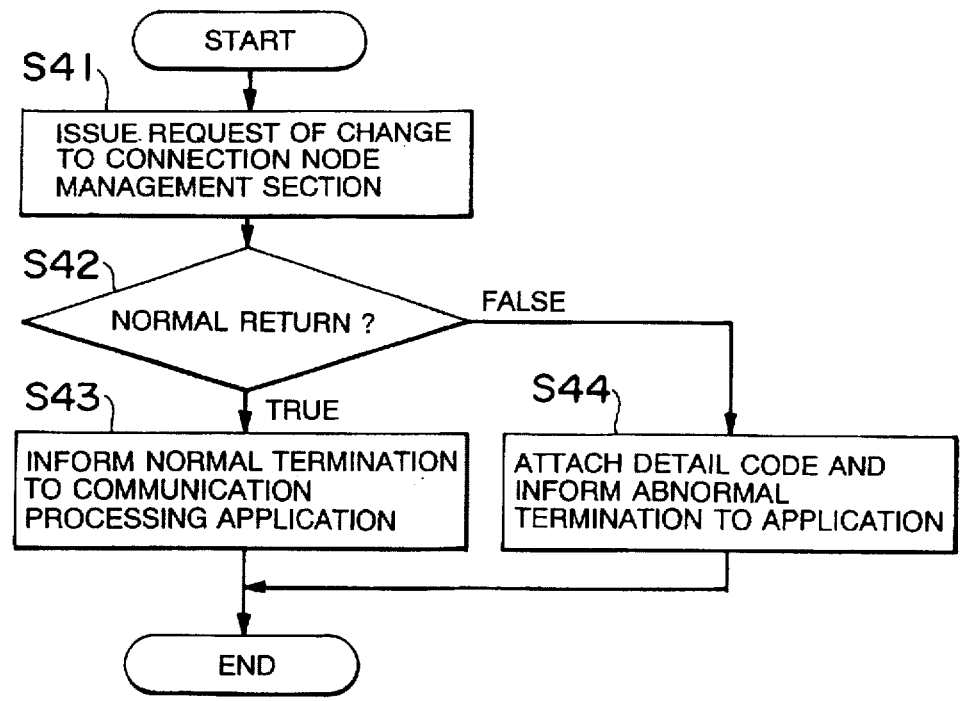
FIG. 7 is a flowchart for illustrating the operation of a destination node name changing section of the network system of FIG. 4.

The process of the destination node name changing section 37 shown in FIG. 7 is effected as follows.

When the process is started, a request of change of destination node name is made to the connection node management section 38 (step S41), whether it is normal return or not is determined (step S42), and if it is "true", the normal termination is informed to the communication processing application (step S43) and the process is terminated. If it is determined to be "false" in the step S42, a detail code of abnormal return is attached thereto and the abnormal termination is informed to the application (step S44) and the process is terminated.

Figure 8:
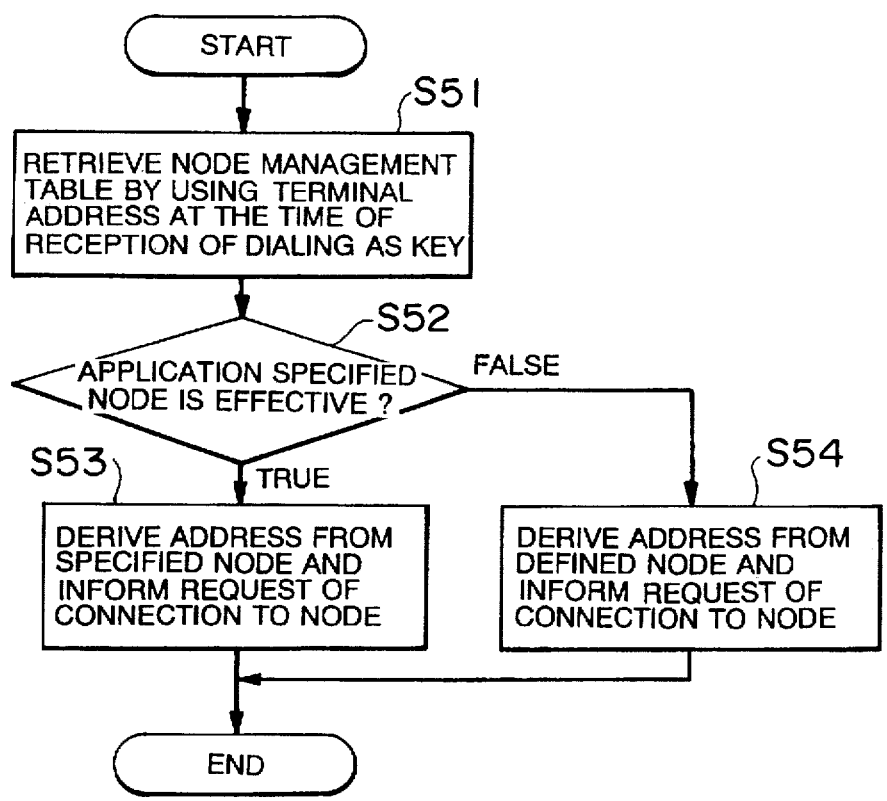
FIG. 8 is a flowchart for illustrating the operation of a connection process effecting section of the network system of FIG. 4.

The process of the connecting process effecting section 39 shown in FIG. 8 is effected as follows.

When the process is started, the node management table is retrieved with the terminal address at the time of reception of dialing used as a key (step S51), whether an application specified node is effective or not is determined (step S52), and if it is "true", an address is derived from the specified node name, a connection request is informed to the node (step S53), and the process is terminated. If it is determined to be "false" in the step S52, an address is derived from the definition node name and a connection request is informed to the node (step S54), and the process is terminated.

Figure 9:
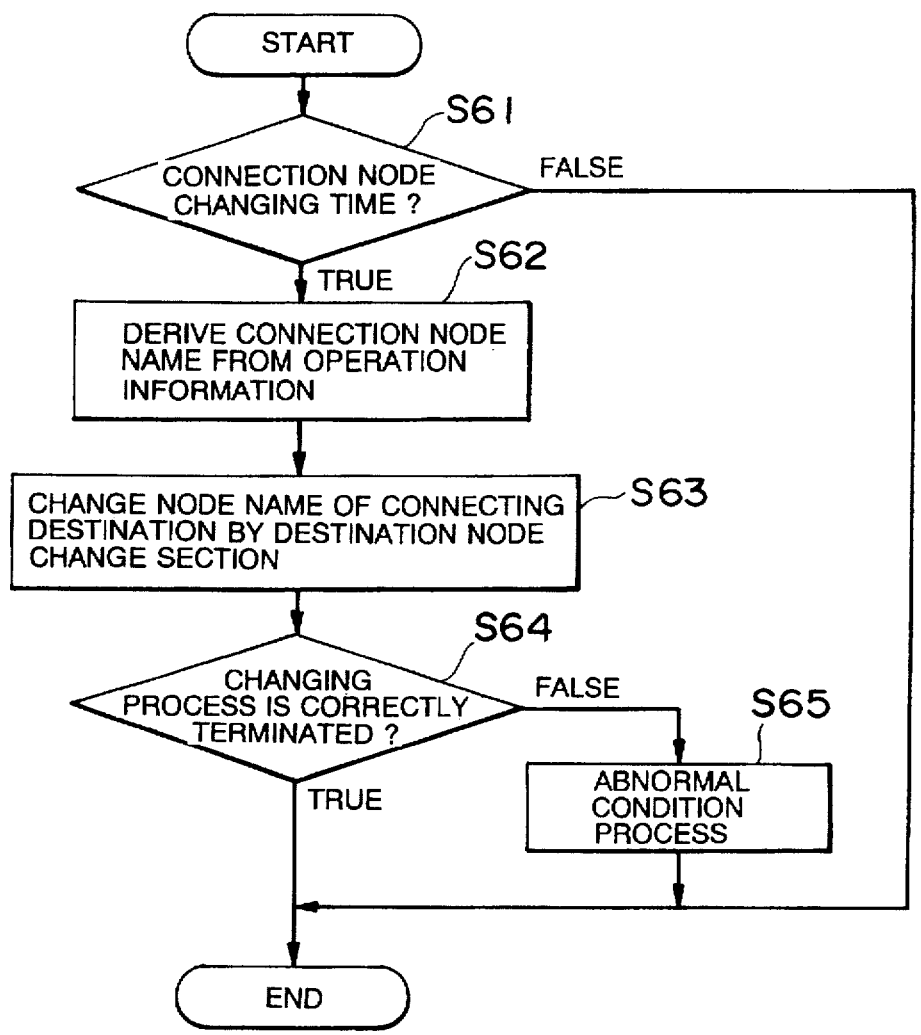
FIG. 9 is a flowchart for illustrating the operation of an operation information deriving section of the network system of FIG. 4.

The process of the operation information fetching section 35 shown in FIG. 9 is effected as follows.

When the process is started, whether it is the connection node changing time or not is determined (step S61), and if it is "true", a connection node name is derived from operation information (step S62). Further, a connecting destination node name is derived by the destination node name changing section 37 (step S63), whether the changing process is correctly terminated or not is determined (step S64), and if it is "true", the process is terminated. If it is determined to be "false" in the step S64, an abnormal-condition process is effected (step S65) and the process is terminated. If it is determined to be "false" in the step S61, the process is directly terminated.

As described above, in the network system of FIGS. 3 and 4, it becomes possible to flexibly and adequately effect the destination management, take the countermeasure against defects, and effect the operation process according to the operating condition of the system between a switched network to which a terminal is connected and a network to which the host processor is connected when dialing is made from the terminal.

Fourth Embodiment
<System Construction>

Figure 10:
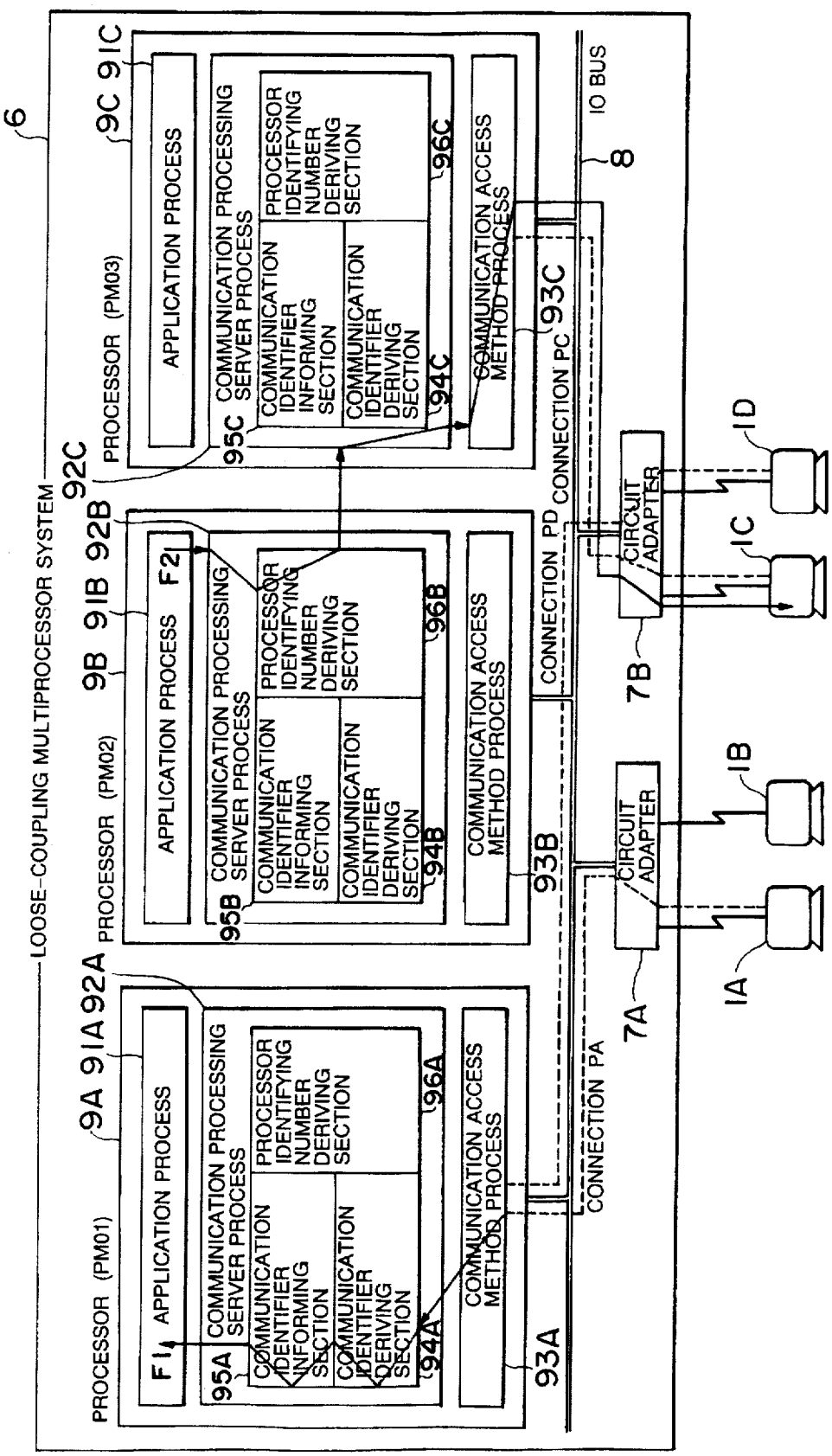
FIG. 10 is a block diagram showing the construction of a multiprocessor system according to a fourth embodiment of the present invention.

FIG. 10 shows the construction of a multiprocessor system according to a fourth embodiment of the present invention. In FIG. 10, substantially the same portions as those of FIG. 2 are denoted by the same reference numerals.

The multiprocessor system of FIG. 10 includes terminals 1A, 1B, 1C and 1D and a loose-coupling multiprocessor system 6. The loose-coupling multiprocessor system 6 includes circuit adapters 7A, 7B, IO (input/output) bus 8, and processors 9A, 9B, 9C.

The circuit adapter 7A is connected to the terminals 1A and 1B and the circuit adapter 7B is connected to the terminals 1C and 1D. The circuit adapters 7A and 7B are connected to the IO bus 8 which is in turn connected to the processors 9A, 9B and 9C.

The processors 9A, 9B, 9C respectively include application process executing sections 91A, 91B, 91C, communication processing server process execution sections 92A, 92B, 92C and communication access method process execution sections 93A, 93B, 93C.

Each of the communication processing server process execution sections 92A, 92B, 92C derives a processor identifying number from a communication identifier specified according to a terminal of transmitting destination and sends transmission data to a processor determined by the processor identifying number so as to effect the transmission process by the communication processing server process in the processor at the time of execution of a system call of data transmission by the application process. The communication identifier is defined with its inherent meaning in the multiprocessor system so as to include a processor identifying number and an array number in the terminal management table stored in the processor.

The communication processing server process execution sections 92A, 92B, 92C respectively include communication identifier deriving sections 94A, 94B, 94C, communication identifier informing sections 95A, 95B, 95C, and processor identifying number deriving sections 96A, 96B, 96C.

Each of the communication identifier deriving sections 94A, 94B, 94C derives an inherent number in the processor system obtained by a combination of a processor identifying number and an array number in the terminal management table in the processor as a communication identifier at the time of connection with the processor of the terminal.

Each of the communication identifier informing sections 95A, 95B, 95C informs the communication identifier to the application process at the time of informing of the result of terminal connection process.

Each of the processor identifying number deriving sections 96A, 96B, 96C derives a processor identifying number from the communication identifier specified for the terminal of transmitting destination at the time of execution of a system call of data transmission by the application process.

The IO bus 8 is used for input/output of data between the processors 9A to 9C and the circuit adapters 7A, 7B. That is, a multiprocessor system shown in FIG. 10 is a multiprocessor system 6 having a plurality of processors 9A, 9B, 9C loosely connected with the circuit adapters 7A, 7B via the IO bus 8. Access to the circuit adapters 7A, 7B can be made from a desired one of the processors 9A, 9B, 9C.

Further, the application process executing sections 91A, 91B, 91C, communication processing server process execution sections 92A, 92B, 92C and communication access method process execution sections 93A, 93B, 93C are respectively provided on the processors 9A, 9B, 9C. A transmission/reception system call issued from each application process is received by the communication processing server process on a corresponding one of the processors. Then, whether the processor itself processes it by use of the communication access method process or a request that the process should be executed by the communication processing server process on another processor is issued is determined according to the position of the processor connected to the terminal and then the branching process is effected.

Connections PA, PC and PD indicated by broken lines in FIG. 10 show an example of logical connection relation and the connection relation is called connection, session or communication path, for example. The logical connection relation between the terminals 1A to 1D and the processors 9A to 9C by the connections PA, PC and PD is set such that the terminal 1A is connected to the processor 9A, the terminal 1B is not connected to the system, the terminal 1C is connected to the processor 9C, and the terminal 1D is connected to the processor 9A.

Data flow F1 indicates the flow of data at the time of connection in a case where the terminal 1A is connected to the processor 9A and data flow F2 indicates the flow of data when the application process in the processor 9B executes a data transmission system call to the terminal 1C. Assume that the logical processor names of the respective processors 9A, 9B and 9C are PM01, PM02 and PM03.

<Extraction of Communication Identifier>

Figure 11:
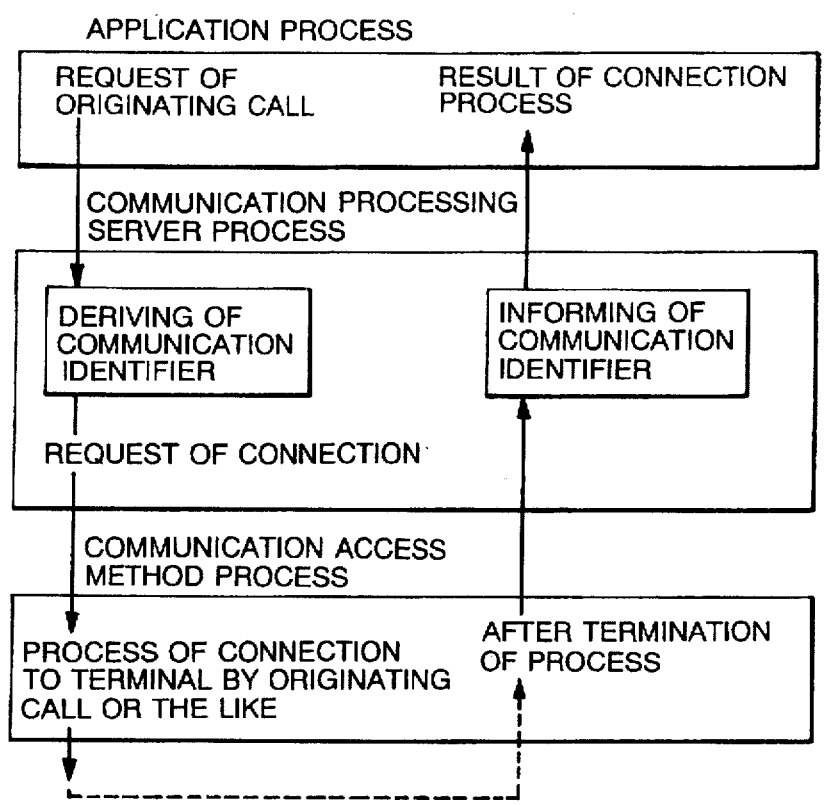
FIG. 11 is a data flow diagram at the time of terminal connection by terminating call, for schematically illustrating the operation of the multiprocessor system of FIG. 10.
Figure 12:
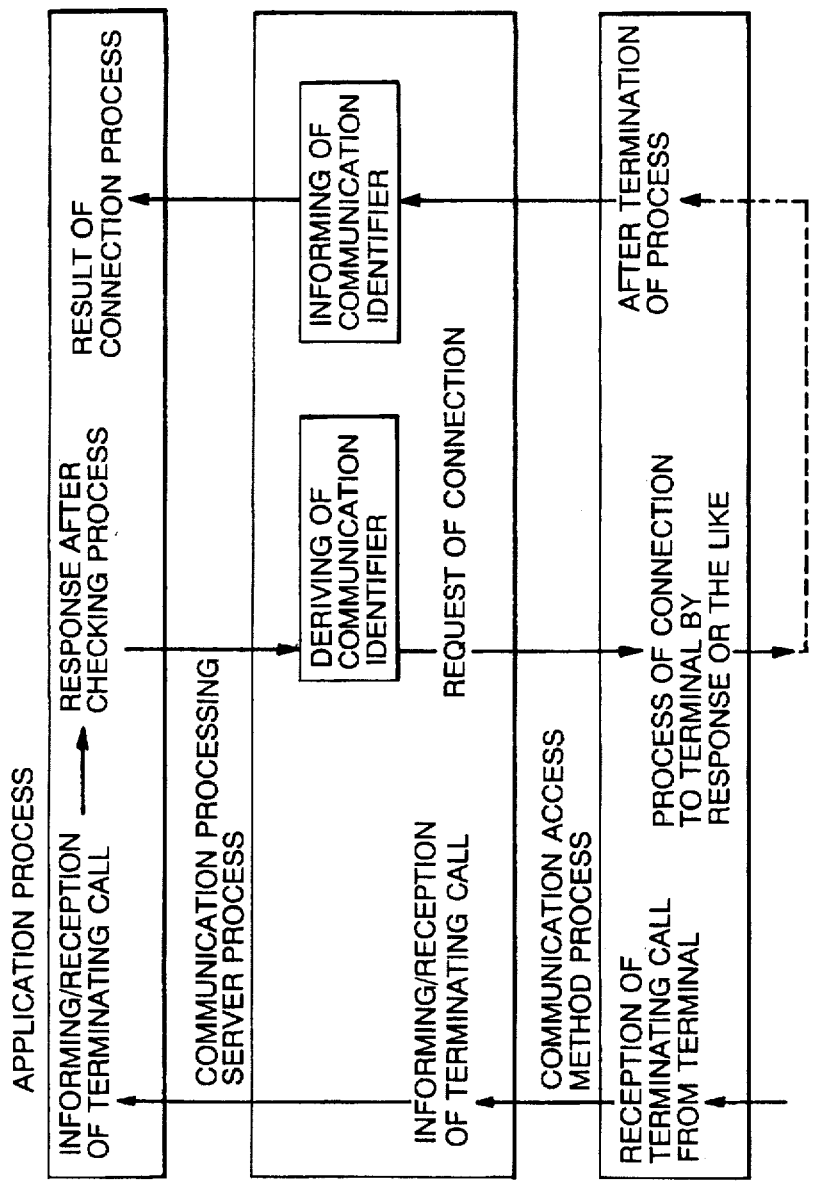
FIG. 12 is a data flow diagram at the time of terminal connection by originating call, for schematically illustrating the operation of the multiprocessor system of FIG. 10.

Extraction of the communication identifier is effected in the terminal connection process effected in response to an originating call request from the application process or informing of the terminating call from the terminal to the application process as indicated by the data flow at the time of terminal connection by the originating call and the data flow at the time of terminal connection by the terminating call which are shown in FIGS. 11 and 12.

Figure 13:
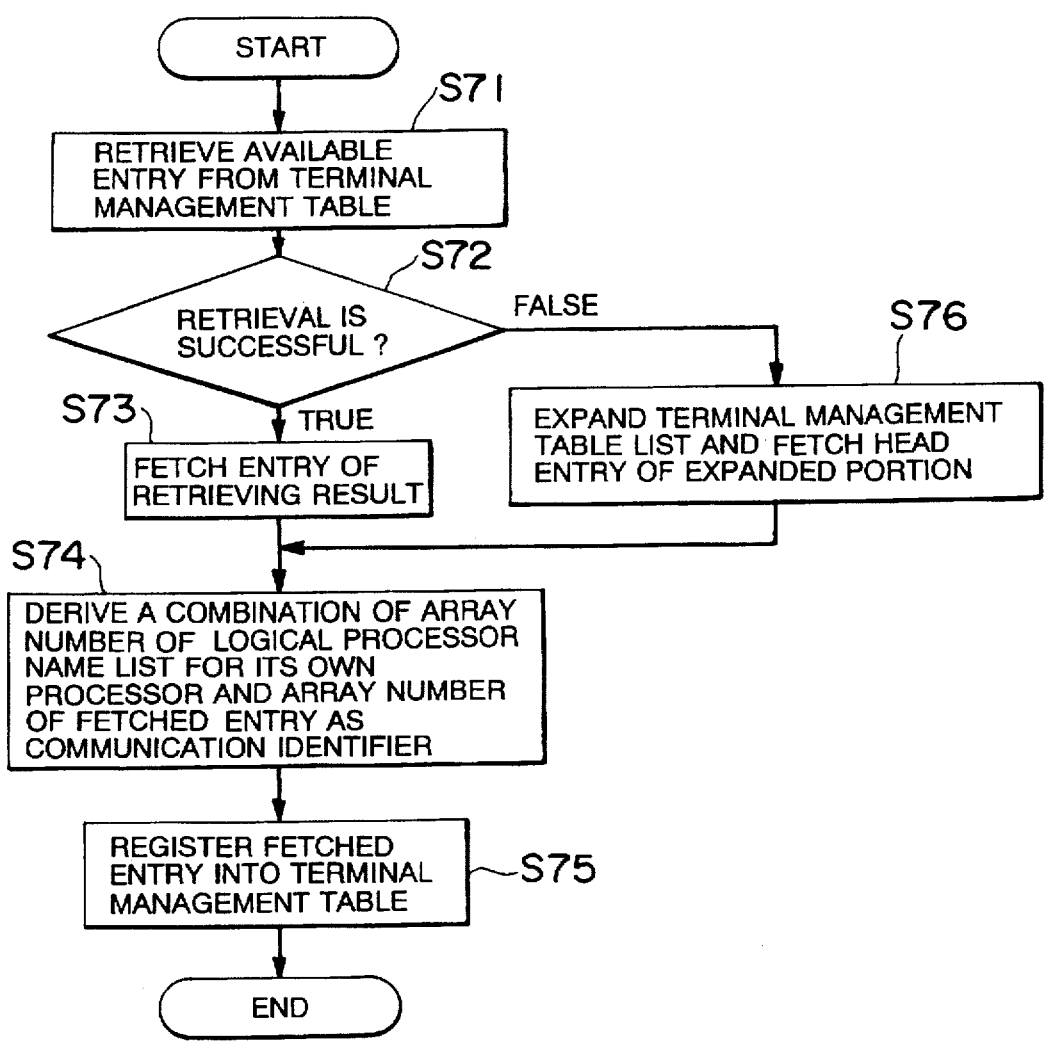
FIG. 13 is a flowchart for illustrating the operation of communication identifier deriving process of the multiprocessor system of FIG. 10.

FIG. 13 shows a flowchart of the communication identifier deriving process.

The communication processing server process retrieves an available entry from the terminal management table list in its own processor (step S71) before issuing a request of connection process to the communication access method process. Then, whether the retrieving process is successfully effected or not is determined (step S72), and if it is "true", the array number of the retrieved entry is fetched (step S73), and after a number obtained by a combination of the array number of the entry and the array number of its own processor in the logical processor name list is derived as a communication identifier (step S74), it is stored into the terminal management table (step S75) and the process is terminated.

If it is determined to be "false" in the step S72, that is, if no entry is present in the terminal management table list, the terminal management table list is expanded, the head entry of the expanded portion is acquired (step S76), and then the process of the step S74 is effected.

The thus derived communication identifier is specified as a user request identifier when a request of connection is issued to the communication access method as shown in FIGS. 11 and 12.

<Informing of Communication Identifier>

As shown in FIGS. 11 and 12, the result of connection process is informed from the communication access method process to the communication processing server process at asynchronous timings with respect to the request of connection. Further, the communication processing server process informs the result of connection process together with the communication identifier to the application process.

Figure 14:
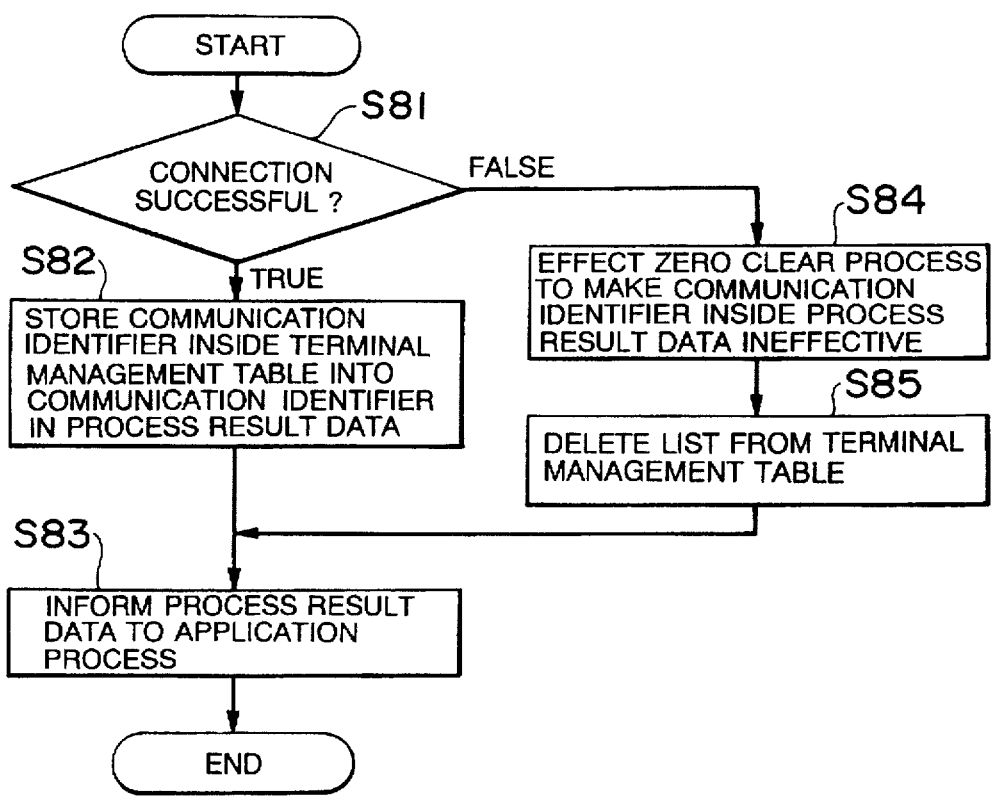
FIG. 14 is a flowchart for illustrating the operation of communication identifier informing process of the multiprocessor system of FIG. 10.

FIG. 14 shows a flowchart of the communication identifier informing process.

The communication processing server process retrieves the terminal management table by using the communication identifier attached to the result of process at this time and informed as a key to determine whether the connection is successfully made or not (step S81). Then, if the determination result of the step S81 is "true", that is, if the result of connection is normal, the communication identifier inside the terminal management table is stored into the communication identifier in the result-of-process data (step S82) and the process result data is informed together with the communication identifier to the application process (step S83) so as to inform that the process is correctly completed and then the process is terminated. If it is determined to be "false" in the step S81, that is, in the abnormal case, in order to make the communication identifier in the result-of-process data ineffective, the communication identifier inside the terminal management table is cleared to zero (step S84), the terminal management table is deleted from the list (step S85) and process result data having the cause of error attached thereto is informed to the application process (step S83) to inform that the process is ended with abnormal result and then the process is terminated.

<Acquisition of Processor Identifying Number>

Figure 15:
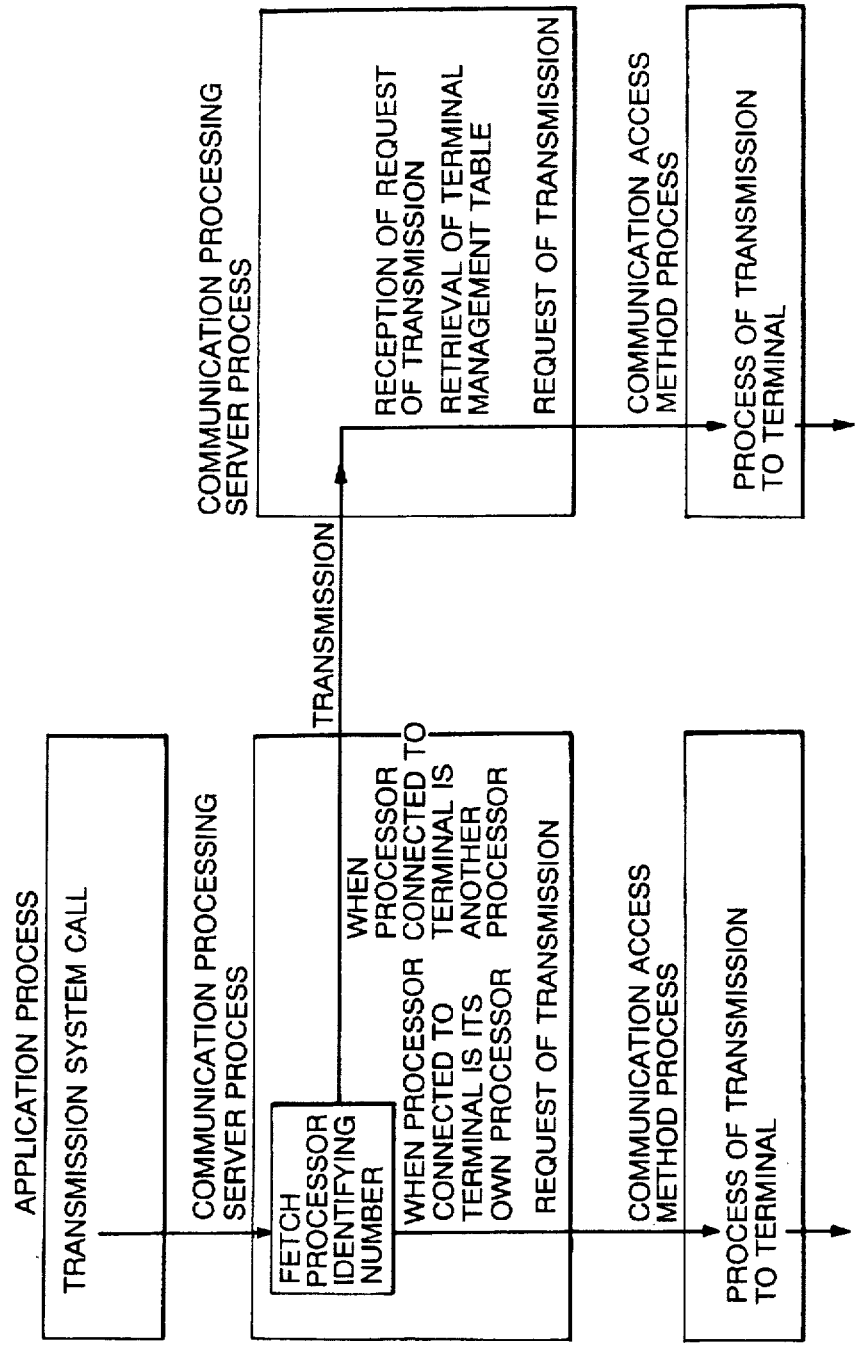
FIG. 15 is a data flow diagram at the time of data transmission, for schematically illustrating the operation of the multiprocessor system of FIG. 10.

As shown by the flowchart at the time of data transmission in FIG. 15, the application process specifies a communication identifier corresponding to the connection terminal at the time of execution of transmission system call to acquire a logical processor identifying number.

Figure 16:
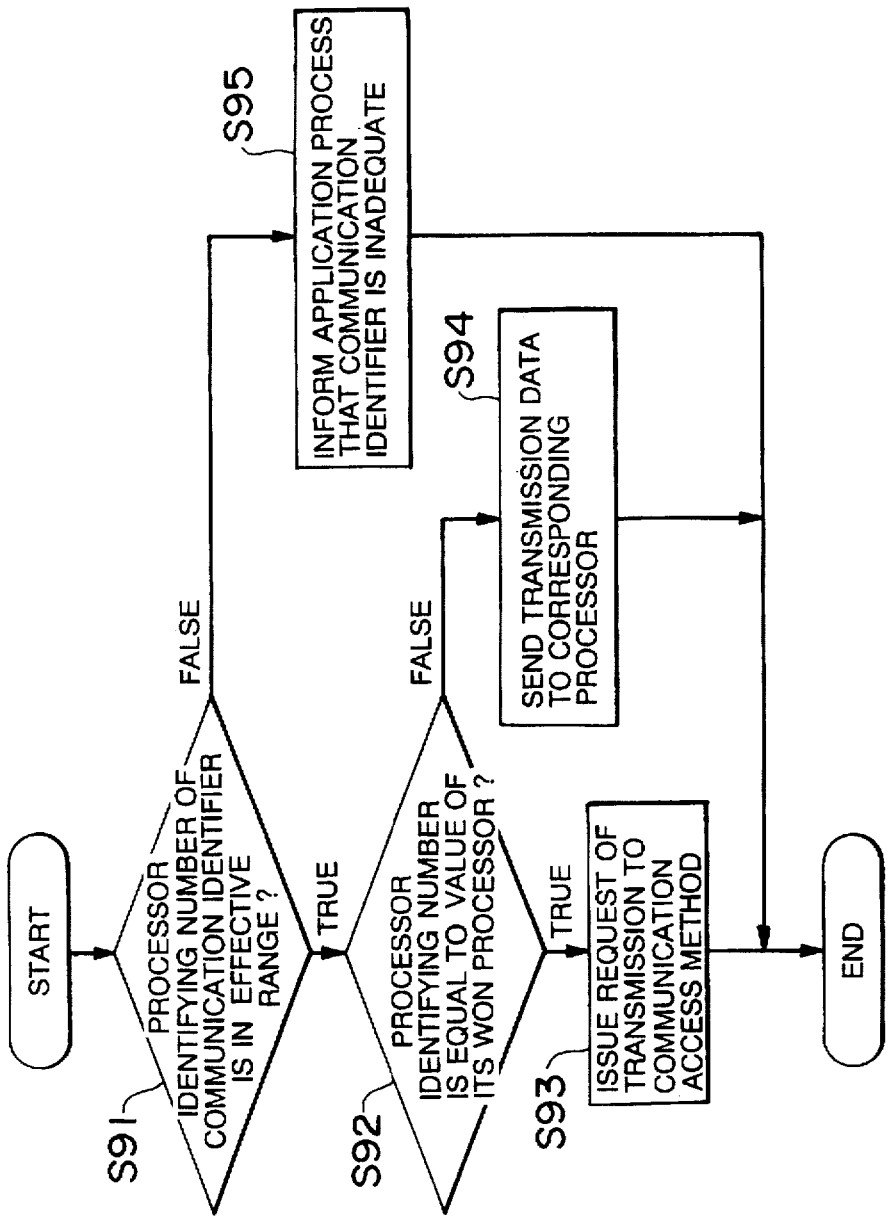
FIG. 16 is a flowchart for illustrating the operation of logical processor identifying number acquiring process of the multiprocessor system of FIG. 10.

FIG. 16 is a flowchart for illustrating the operation of logical processor identifying number acquiring process.

The communication processing server process having received the transmission request checks the validity of the processor identifying number of the specified communication identifier (step S91). Then, if it is determined to be "true" in the step S91, that is, when the logical processor identifying number of the communication identifier is normal, the position of the processor is determined based on the processor identifying number of the communication identifier. At this time, whether the processor identifying number is equal to a value of its own processor or not is checked (step S92), and if it is "true", that is, the corresponding processor is the processor itself, a transmission request is issued to the communication access method process (step S93) and then the process is terminated. Further, if it is determined to be "false" in the step S92, that is, when the corresponding process is another processor, a request of transmission process is made to the communication processing server process in another processor by sending transmission data (step S94) and then the process is terminated. If it is determined to be "false" in the step S91, that is, when the processor identifying number is ineffective, this fact is informed to the application process (step S95) and then the process is terminated.

Figure 17:
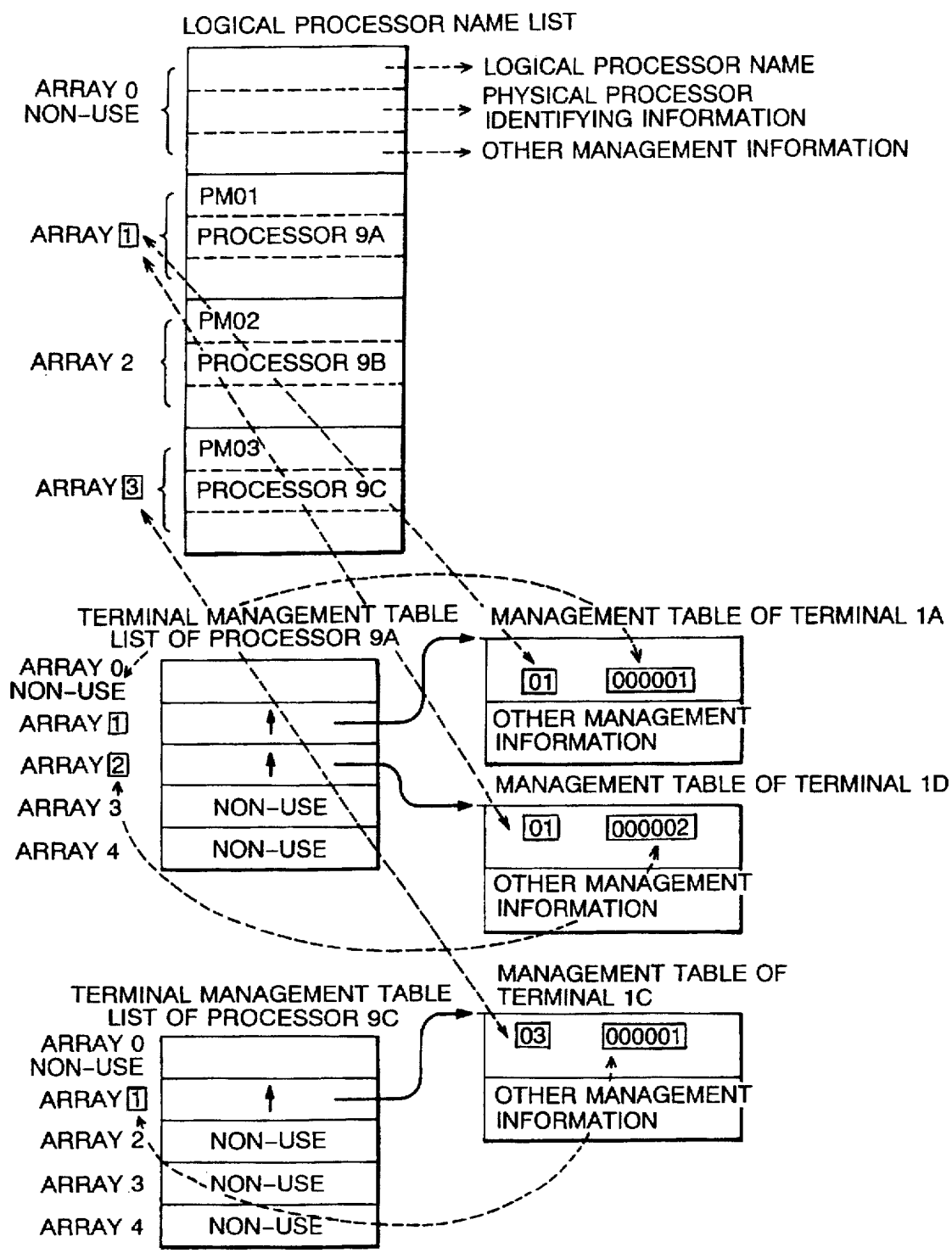
FIG. 17 is a diagram for schematically illustrating a table used in the multiprocessor system of FIG. 10.

FIG. 17 schematically illustrates the relation between the logical processor name list, the terminal management list of the processors 9A, 9C, and the management table of the terminals 1A, 1C, 1D.

The logical processor name list includes a plurality of arrays each having a logical processor name, identifying information of physical processor and other management information thereof, and in FIG. 17, the array 0 indicates the non-use state, PM01 is stored in the array 1 as the logical processor name and information indicating the processor 9A is stored as the physical processor identifying information in the array 1, PM02 is stored in the array 2 as the logical processor name and information indicating the processor 9B is stored as the physical processor identifying information in the array 2, and PM03 is stored in the array 3 as the logical processor name and information indicating the processor 9C is stored as the physical processor identifying information in the array 3.

In the terminal management table list of the processor 9A, the arrays 0, 3 and 4 indicate the non-use state, the management table of the terminal 1A is stored in the array 1 and the management table of the terminal 1D is stored in the array 2. The communication identifier "01 000001" and other management information are stored in the management table of the terminal 1A. "01" among the communication identifier "01 000001" is an array number of the logical processor name list and "000001" thereof is an array number of the terminal management table list. The communication identifier "01 000002" and other management information are stored in the management table of the terminal 1D. "01" among the communication identifier "01 000002" is an array number of the logical processor name list and "000002" thereof is an array number of the terminal management table list.

In the terminal management table list of the processors 9C, the arrays 0, and 2 to 4 indicate the non-use state, the management table of the terminal 1C is stored in the array 1. The communication identifier "03 000001" and other management information are stored in the management table of the terminal 1C. "03" among the communication identifier "03 000001" is an array number of the logical processor name list and "000001" thereof is an array number of the terminal management table list.

<Taking-over of Terminal at the time of Occurrence of Abnormal Condition in Processor>

In the above system, back-up for occurrence of abnormal condition in a processor can be effectively attained.

That is, it is possible that the above-described loose-coupling multiprocessor system 6 gives a standby attribute to one processor and gives an available attribute to the remaining processors, the standby processor is used to be operated as a back-up processor when the available processor is damaged, each processor is given a preset logical processor name, the standby processor takes over the logical processor name of the available processor and the array number of the logical processor name list is allotted as the processor identifying number when the standby processor backs up the available processor which becomes defective so that the relation between the terminal and the communication identifier can be kept unchanged even after the standby processor takes over the terminal which has been connected to the available processor.

When an abnormal condition occurs in a processor, the logical relation between the process in the adapter and the communication access method process in the back-up processor is taken over. Further, the logical relation between the communication access method process and the communication processing server process is also taken over. Thus, the back-up processor takes over the terminal from the processor in which the abnormal condition has occurred.

In this case, the communication processing server process which has recognized occurrence of abnormal condition in processor sets the back-up processor to correspond to the entry which has been set for the logical processor name of the processor whose operation is terminated with abnormal end. Then, the entry which has been set for the logical processor name attached to the back-up processor manages the processor as a processor set in the turn-off state. As a result, since the array number corresponding to the logical processor name can be kept unchanged, the relation between the logical processor name and the terminal connected to the logical processor can be maintained, and thus the application processor can continuously effect the process even when an abnormal condition occurs in a processor by setting up the process by taking the logical processor into account.

An example of the concrete process effected when the processor 9A becomes defective is explained with reference to FIGS. 18 to 22.

Figure 18:
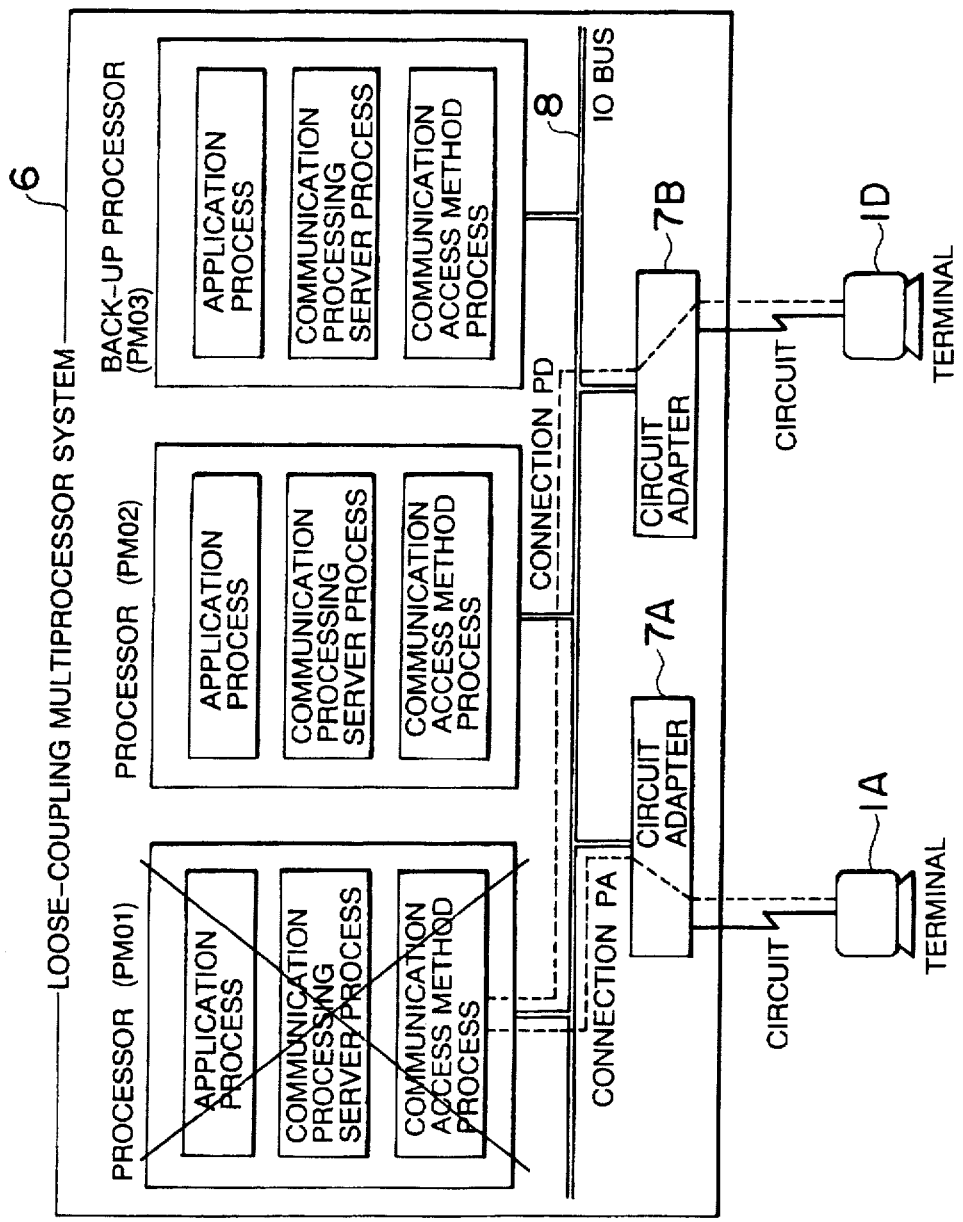
FIG. 18 is a schematic diagram for illustrating the operation of the multiprocessor system of FIG. 10 at the time of occurrence of damage of the processor.

In a state before the processor 9A becomes defective, the terminal 1A is connected to the processor 9A via the connection PA and the terminal 1D is connected to the processor 9A via the connection PD as shown in FIG. 18.

Figure 20:
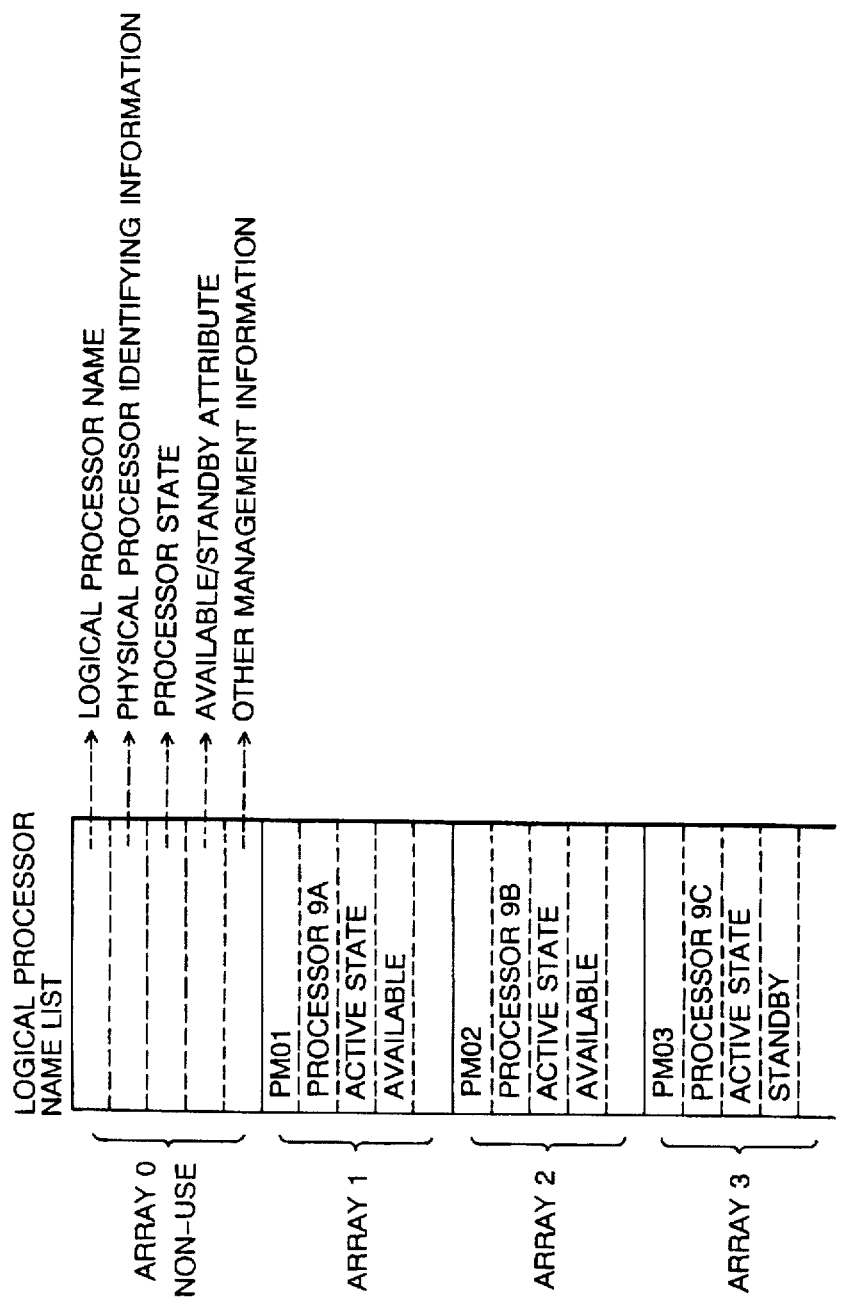
FIG. 20 is a schematic diagram of a logical processor name list before occurrence of the damage, for illustrating the operation of the multiprocessor system of FIG. 10 at the time of occurrence of damage of the processor.

As shown in FIG. 20, the logical processor name list obtained at this time includes a plurality of arrays each having a logical processor name, physical processor identifying information, processor state, available/standby attribute and other management information stored therein. That is, in this example, processor states and available/standby attributes are provided as management information in addition to the example of FIG. 17. In FIG. 20, the array 0 indicates the non-use state, and PM01 is stored as the logical processor name, the processor 9A is stored as the physical processor identifying information, an active state is stored as the processor state, and information of "available" is stored as the available/standby attribute in the array 1. Likewise, in the array 2, PM02 is stored as the logical processor name, the processor 9B is stored as the physical processor identifying information, an active state is stored as the processor state, and information of "available" is stored as the available/standby attribute. In the array 3, PM03 is stored as the logical processor name, the processor 9C is stored as the physical processor identifying information, an active state is stored as the processor state, and information of "standby" is stored as the available/standby attribute. That is, in this case, the processor 9C is used as a standby processor used for back up.

Figure 21:
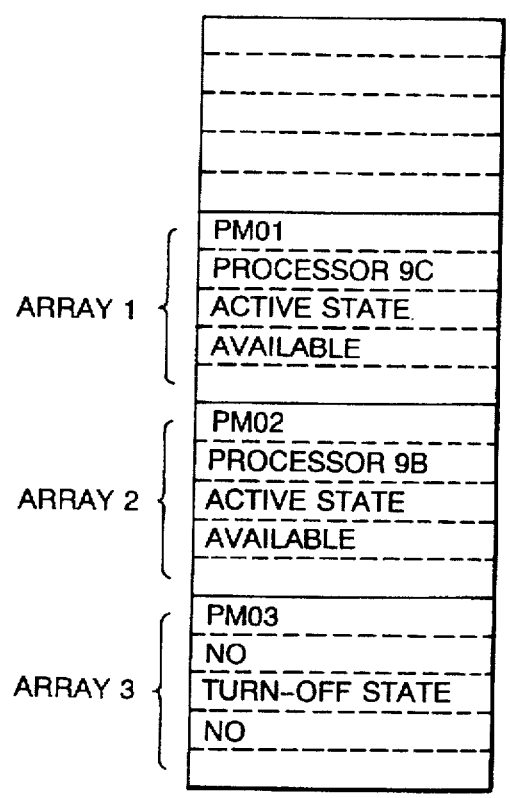
FIG. 21 is a schematic diagram of a logical processor name list at the time of occurrence of the damage, for illustrating the operation of the multiprocessor system of FIG. 10 at the time of occurrence of damage of the processor.

If, in this state, the processor 9A becomes defective, information stored in the array 1 is changed such that PM01 is set as the logical processor name, the processor 9C is set as the physical processor identifying information, an active state is set as the processor state, and information of "available" is set as the available/standby attribute as shown in FIG. 21. Information stored in the array 2 is kept unchanged, that is, PM02 is set as the logical processor name, the processor 9B is set as the physical processor identifying information, an active state is set as the processor state, and information of "available" is set as the available/standby attribute, and information in the array 3 is changed such that PM03 is set as the logical processor name, the physical processor identifying information is omitted, a turn-off state is stored as the processor state, and the available/standby attribute is omitted.

Figure 19:
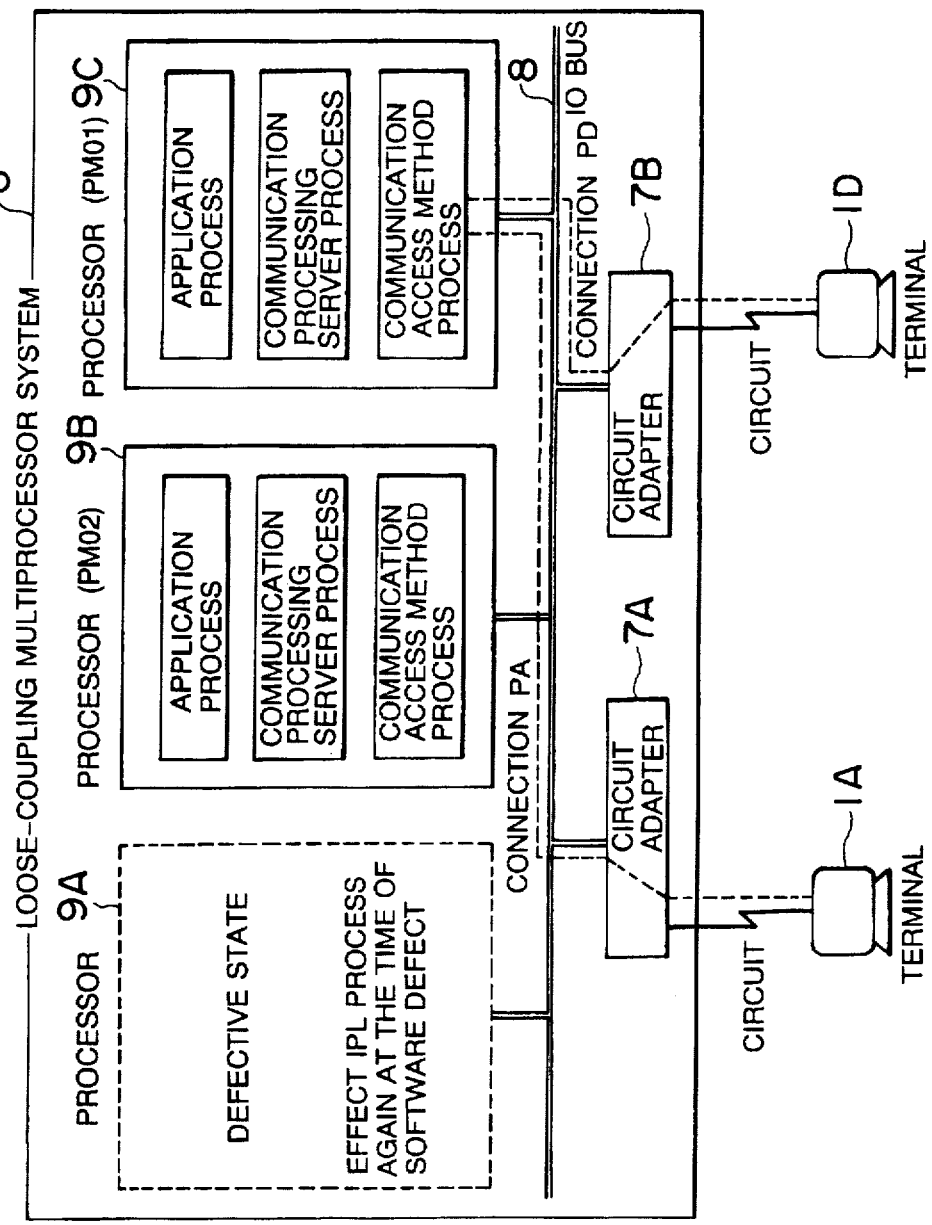
FIG. 19 is a schematic diagram for illustrating the operation of the multiprocessor system of FIG. 10 at the time of back-up for the damaged processor.

As a result, the logical processor number of the processor 9A which becomes defective is taken over to the processor 9C, and as shown in FIG. 19, the function of the processor 9A which becomes defective can be taken over to the processor 9C, the terminal 1A is connected to the processor 9C via the connection PA, and the terminal 1D is connected to the processor 9C via the connection PD. At this time, the processor 9A effects the IPL process again to re-start the operation of the processor and restore the processor if the processor is set into the defective state because of software defect. If the defective state of the processor is caused by hardware defect, it urges the operator to replace the processor module so as to make a recovery from the defect.

Figure 22:
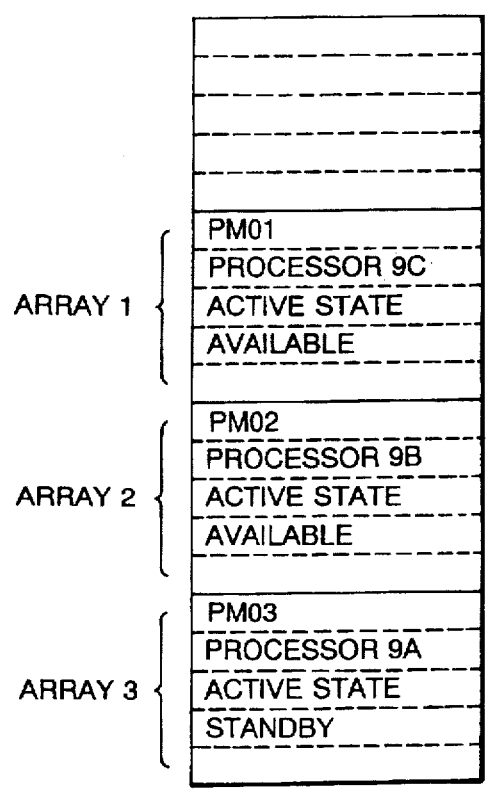
FIG. 22 is a schematic diagram of a logical processor name list after recovery from the damage, for illustrating the operation of the multiprocessor system of FIG. 10 at the time of occurrence of damage of the processor.

If the processor 9A is thus recovered from the defective state, the array 3 is set to a state in which PM03 is set as the logical processor name, the processor 9A is set as the physical processor identifying information, an active state is set as the processor state, and information of "standby" is set as the available/standby attribute as shown in FIG. 22, and the processor 9A is set into the standby state as a next standby processor for back up.

In a case where the application process executes a system call of data transmission to a terminal connected to the system, it is necessary to specify a communication identifier for the connected terminal. The communication identifier is informed only to the application process which has effected the connecting process. Therefore, it is necessary for other application processes, particularly, application process in the PM to which the terminal is not connected to acquire the communication identifier by any means. In this case, there are various methods for acquiring the communication identifier, but it is possible for the application process which has effected the connecting process to broadcast the communication identifier to all of the processes, for example. In this case, the broadcasting is necessary to make the communication identifier ineffective when the terminal is disconnected.

In the conventional loose-coupling multiprocessor system, a table defining the relation between the processor and the terminal connected to the system is formed at the time of system generation. Then, at the time of system starting, the table is loaded into the main memory device of each of the processors and the processor is determined by referring to the loaded information at the time of process of a transmission system call issued by the application process. Therefore, it is impossible to dynamically change the processor to which the terminal is connected because it is necessary to serve the purpose of distributing the load of the processor, for example.

Further, a loose-coupling multiprocessor system constructed to dynamically change the processor to which the terminal is connected is also conventionally provided. However, in this case, the application process which can effect the transmission/reception process with respect to the terminal connected to the processor is limited to application processes operated on the above processor.

It is impossible to simultaneously enhance the performance of the terminal connecting process and the performance of the data transmission/reception process when the terminal is used in the loose-coupling multiprocessor system.

Therefore, the trade-off must be set according to the practical operation. The problem is that the alternative is made by the system or the user.

First, as a method effected when the system makes the alternative, a method based on the definition of operation of the terminal and a method for making the alternative based on parameters by use of the application process at the time of connection are proposed. However, they are not practical in that the processing logic of the system program becomes complicated and the system program is constructed in two series and becomes complicated.

On the other hand, when the user makes the alternative, he only selects one of them according to his own operation and there occurs no problem.

As described above, it is difficult for the system to commonly use the terminal while meeting the requirement on the operation of the user.

Further, conventionally, there is no such function that the back-up processor can take over the terminal when a processor connected to the terminal becomes defective, and commonly use the terminal taken over from the defective processor.

However, in the loose-coupling multiprocessor, when the terminal is connected to the system, the decision logic of a processor to be connected is desirable in enhancing the flexibility of operation design if it can utilize a combination of a plurality of methods such as a method for defining at the time of generation and a method of selection according to the load condition of each processor at the time of operation.

Likewise, from the viewpoint of improvement of the flexibility of operation design, it is desirable to commonly use the terminal connected to the processor by the application process in each of the processors constructing the system.

Further, when the loose-coupling multiprocessor system is used as a fault tolerant computer, it is desirable to keep the interface of transmission/reception system call effected by the application process unchanged before and after the connected terminal is taken over from the defective processor to the back-up processor.

Among the conventional multiprocessor system, no multiprocessor system which can satisfy all of the above requirements is provided, but according to the multiprocessor system shown in FIG. 10, all of the above requirements can be satisfied.

Therefore, in the multiprocessor system of FIG. 10, the communication identifier is structured as described before and the application process is caused to derive a processor identifying number from a communication identifier specified for the connected terminal at the time of system call so that a processor connected to the terminal can be specified. Further, an array number in the logical processor name list is allotted as a processor number so that the universality of the interface of communication system call can be kept even when the processor becomes defective and the terminal is taken over to the back-up processor.

Further, the multiprocessor with the above construction can be used as an FEP system in the network system of FIG. 3 described before.

In this case, for example, the FEP system of FIG. 3 is constructed by use of the loose-coupling multiprocessor system 6 shown in FIG. 10 and the network system of FIG. 3 can be more effectively constructed.

As described above, according to the multiprocessor system of FIG. 10, a communication identifier structured as a combination of two information items, that is, a processor identifying number and an array number in the terminal management table is dynamically allotted by the communication processing server process at the time of terminal connection, the communication identifier defined with its own inherent meaning in the multiprocessor system is informed to the application process, a processor is determined based on a communication identifier specified for each connected terminal at the time of transmission system call to the connected terminal by the application process, and transmission data is sent to the processor. Therefore, the data transmission/reception process can be effected by use of the application process in each processor, the processor to which the terminal can be dynamically changed, the terminal can be commonly used by the application process in each processor, and the multiprocessor system can be always operated and can be adequately used for the destination management, countermeasure against defects, and operation process in the network system.

It is apparent that, in this invention, a wide range of different working modes can be formed based on the invention without deviating from the spirit and scope of the invention.

What is claimed is:

1. A network system, comprising:
   at least one host processor having means for executing a communication access method and a communication processing application;
   a plurality of terminals;
   at least one network node each coupled to one of said at least one host processor;
   a switched network coupled to said terminals; and
   at least one front end processor system, connected to said host processor via said network node and connected to said plurality of terminals via said switched network, each executing the communication processing application, a process of communication processing server and the communication access method, effecting management and connection of said network node and said host processor for connecting said terminals in response to dialing from said terminals, referring to said network node registered as a name of a connecting destination for a terminal specified by the communication processing application, and changing/updating the name of the connecting destination of the specified terminal by the communication processing application, each of said at least one front end processor system including
   connection node management means for holding a node management table indicating a connecting relationship between said terminals and said network node of a corresponding host processor to be connected to each of said terminals, for managing connection of network nodes of one of said processors to which said terminal is connected when dialing is made from the terminal to said front end processor system;
   destination name reference means informing a network node name registered as the connecting destination name of the specified terminal in said node management table to the communication processing application when the communication processing application operated in said front end processor system specifies a terminal name and issues a system call of destination name reference;
   destination name changing means for updating the connecting destination name of the specified terminal in the node management table to a specified network node name when the communication processing application specifies the terminal name and the specified network node name and issues a system call of destination name change;
   connecting process effecting means for referring to the connection node management table to determine a connection network node and transmit a connection request to said node when dialing from the terminal to said front end processor system; and
   operation information fetching means for fetching operation information used by the communication processing application for changing the connecting destination name of the terminal.

2. A network system according to claim 1, wherein said operation information fetching means includes means for referring to the operation schedule of the host processor, and said connection node management means includes means for dealing with the connection node of the terminal as the network node in the host processor at the time of operation of the host processor based on the operation schedule of the host processor and changing the destination as the network node in another host processor which can be used instead of the former host processor at the time of interruption of the former host processor.

3. A network system according to claim 1, wherein said operation information fetching means includes means for referring to the operation schedule of the host processor, and said connection node management means includes means for dealing with the connection node of the terminal as the network node in the host processor at the time of operation of the host processor based on the operation schedule of the host processor and dealing with the communication processing application executed in the front end processor system as the network node which is to be connected to the terminal and changing the destination at the time of interruption of the host processor.

4. A network system according to claim 1, wherein said operation information fetching means includes means for determining the operation schedule by permitting the communication processing application operated in the front end processor system to communicate with the communication processing application operated in the host processor.

5. A network system, comprising:

at least one network node;

at least one host processor, coupled to said at least one network node, having means for executing a process of a communication access method and a communication processing application;

a switched network;

a plurality of terminals coupled to said switched network; and at least one front end processor system, connected to said at least one host processor via the network node and connected to said plurality of terminals via said switched network, each including means for executing the communication processing application, a process of communication processing server and the process of the communication access method, for effecting the management and connection of the network node and the host processor, for connecting said terminals in response to dialing from said terminals, referring to the network node registered as a name of a connecting destination for a terminal specified by the communication processing application, and changing/updating the name of the connecting destination of the specified terminal by a communication processing application, said front end processor system including connection node management means holding a node management table indicating the connecting relation between said terminals and said at least one network node of said at least one host processor to be connected to said terminals, for managing the connection to the network node to which the specified terminal is connected when dialing from the specified terminal to said front end processor system;

destination name reference means for informing a network node name registered as the connecting destination name of the specified terminal in said node management table to the communication processing application when the communication processing application operated in said front end processor system specifies a terminal name and issues a system call of destination name reference;

destination name changing means for updating the connecting destination name of the specified terminal in the node management table to a specified network node name when the communication processing application specifies the terminal name and the specified network node name and issues a system call of destination name change;

connecting processing effecting means for referring to the connection node management table to determine a connection network node and transmitting a connection request to connection network node when dialing from the terminal to said front end processor system;

operation information fetching means for fetching operation information used by the communication processing application for changing the connecting destination name of the terminal; and a loose-coupling multiprocessor system which has a plurality of multiprocessors connected in a parallel arrangement to an input/output bus and each of which includes application process means for executing application processes containing the communication processing application process, communication processing server process means for executing the communication processing server process and communication access method process means for executing the communication access method process; and said communication processing server process means includes means for deriving a processor identifying number from a communication identifier which is specified according to the terminal of the transmitting destination and which is set with its inherent meaning in the multiprocessor system including processor identifying numbers and array numbers in the terminal management table stored in the processor at the time of execution of a system call of a data transmission by the application process and sending transmission data to a processor determined by the processor identifying number so as to effect the transmission process to the terminal by the communication processing server process of the processor.

6. A network system according to claim 5, wherein said communication processing server process means includes communication identifier deriving means for deriving an inherent number in said multiprocessor system obtained by a combination of the processor identifying number and the array number in the terminal management table in the processor as a communication identifier at the time of connection of the terminal to the processor, communication identifier informing means for informing the communication identifier to the application process at the time of informing of the processing result of the terminal connection, and processor identifying number deriving means for deriving a processor identifying number from the communication identifier specified for the terminal of transmitting destination at the time of execution of the system call of data transmission by the application process.

7. A network system according to claim 5, wherein said loose-coupling multiprocessor system constructing said front end processor is a multiprocessor system which gives a standby attribute to one of the processors and give an available attribute to the remaining processors, said standby processor being operated as a back-up processor when said available processor becomes defective, and said multiprocessor system keeps the relation between the terminal and the communication identifier unchanged even after said standby processor takes over the terminal connected to the available processor by giving a preset logical processor name to each processor, permitting said standby processor to take over the logical processor name of the available processor when said standby processor backs up the available processor which becomes defective, and allotting an array number of the logical processor name list as a processor identifying number.

* * * * *